US010212486B2

(12) United States Patent
Chan et al.

(10) Patent No.: US 10,212,486 B2
(45) Date of Patent: Feb. 19, 2019

(54) ELEMENTARY BITSTREAM CRYPTOGRAPHIC MATERIAL TRANSPORT SYSTEMS AND METHODS

(71) Applicant: DIVX, LLC, San Diego, CA (US)

(72) Inventors: Francis Yee-Dug Chan, San Diego, CA (US); Kourosh Soroushian, San Diego, CA (US); Andrew Jeffrey Wood, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

(21) Appl. No.: 15/615,626

(22) Filed: Jun. 6, 2017

(65) Prior Publication Data

US 2017/0280203 A1    Sep. 28, 2017

Related U.S. Application Data

(63) Continuation of application No. 14/839,783, filed on Aug. 28, 2015, now Pat. No. 9,706,259, which is a
(Continued)

(51) Int. Cl.
*H04L 29/06* (2006.01)
*H04N 21/6334* (2011.01)
(Continued)

(52) U.S. Cl.
CPC ... *H04N 21/63345* (2013.01); *H04L 63/0428* (2013.01); *H04L 65/607* (2013.01);
(Continued)

(58) Field of Classification Search
CPC .................................................. H04L 63/0428
See application file for complete search history.

(56) References Cited

U.S. PATENT DOCUMENTS

| 4,009,331 A | 2/1977 | Goldmark et al. |
| 4,694,357 A | 9/1987 | Rahman et al. |

(Continued)

FOREIGN PATENT DOCUMENTS

| AU | 2010203605 B2 | 5/2015 |
| CN | 1169229 | 12/1997 |

(Continued)

OTHER PUBLICATIONS

Taxan, A Vel LinkPlayer2 for Consumer, I-O Data USA—Products—Home Entertainment, printed May 4, 2007 from http://www.iodata.com/usa/products/products.php?cat=HNP&sc=AVEL&pId=AVLP2/DVDLA&ts=2&tsc, 1 pg.

(Continued)

*Primary Examiner* — Dao Q Ho
(74) *Attorney, Agent, or Firm* — KPPB LLP

(57) ABSTRACT

Systems and methods for providing multimedia content from one process or component to another process or component over an unsecured connection are provided. One embodiment includes obtaining the cryptographic information, extracting the at least partially encrypted video data from the container file to create an elementary bitstream, enciphering the cryptographic information, inserting the cryptographic information in the elementary bitstream, providing the elementary bitstream to a video decoder, extracting the cryptographic information from the elementary bitstream at the video decoder, deciphering the cryptographic information, decrypting the elementary bitstream with the cryptographic information and decoding the elementary bitstream for rendering on a display device using the video decoder.

25 Claims, 8 Drawing Sheets

Related U.S. Application Data continuation of application No. 14/306,146, filed on Jun. 16, 2014, now Pat. No. 9,124,773, which is a continuation of application No. 12/946,631, filed on Nov. 15, 2010, now Pat. No. 8,781,122.

(60) Provisional application No. 61/266,982, filed on Dec. 4, 2009.

(51) Int. Cl.
  *H04N 21/235* (2011.01)
  *H04N 21/236* (2011.01)
  *H04N 21/434* (2011.01)
  *H04N 21/4405* (2011.01)
  *H04N 7/167* (2011.01)
  *H04N 21/43* (2011.01)

(52) U.S. Cl.
  CPC ....... *H04N 7/1675* (2013.01); *H04N 21/2351* (2013.01); *H04N 21/23614* (2013.01); *H04N 21/4302* (2013.01); *H04N 21/4348* (2013.01); *H04N 21/4405* (2013.01)

(56) References Cited

U.S. PATENT DOCUMENTS

| | | |
|---|---|---|
| 4,802,170 A | 1/1989 | Trottier |
| 4,964,069 A | 10/1990 | Ely |
| 5,119,474 A | 6/1992 | Beitel et al. |
| 5,274,758 A | 12/1993 | Beitel et al. |
| 5,361,332 A | 11/1994 | Yoshida et al. |
| 5,396,497 A | 3/1995 | Veltman |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,479,303 A | 12/1995 | Suzuki et al. |
| 5,487,167 A | 1/1996 | Dinallo et al. |
| 5,502,766 A | 3/1996 | Boebert et al. |
| 5,509,070 A | 4/1996 | Schull |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,583,652 A | 12/1996 | Ware |
| 5,589,993 A | 12/1996 | Naimpally et al. |
| 5,621,794 A | 4/1997 | Matsuda et al. |
| 5,627,936 A | 5/1997 | Prasad |
| 5,633,472 A | 5/1997 | DeWitt et al. |
| 5,642,171 A | 6/1997 | Baumgartner et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,715,403 A | 2/1998 | Stefik |
| 5,717,816 A | 2/1998 | Boyce et al. |
| 5,719,786 A | 2/1998 | Nelson et al. |
| 5,745,643 A | 4/1998 | Mishina |
| 5,751,280 A | 5/1998 | Abbott |
| 5,754,648 A | 5/1998 | Ryan et al. |
| 5,763,800 A | 6/1998 | Rossum et al. |
| 5,765,164 A | 6/1998 | Prasad et al. |
| 5,794,018 A | 8/1998 | Vrvilo et al. |
| 5,805,700 A | 9/1998 | Nardone et al. |
| 5,822,524 A | 10/1998 | Chen et al. |
| 5,828,370 A | 10/1998 | Moeller et al. |
| 5,841,432 A | 11/1998 | Carmel et al. |
| 5,844,575 A | 12/1998 | Reid |
| 5,848,217 A | 12/1998 | Tsukagoshi et al. |
| 5,867,625 A | 2/1999 | McLaren |
| 5,887,110 A | 3/1999 | Sakamoto et al. |
| 5,892,900 A | 4/1999 | Ginter et al. |
| 5,903,261 A | 5/1999 | Walsh et al. |
| 5,907,597 A | 5/1999 | Mark |
| 5,946,446 A | 8/1999 | Yanagihara |
| 5,956,729 A | 9/1999 | Goetz et al. |
| 5,959,690 A | 9/1999 | Toebes, VIII et al. |
| 5,970,147 A | 10/1999 | Davis |
| 5,999,812 A | 12/1999 | Himsworth |
| 6,031,622 A | 2/2000 | Ristow et al. |
| 6,038,257 A | 3/2000 | Brusewitz et al. |
| 6,044,469 A | 3/2000 | Horstmann |
| 6,046,778 A | 4/2000 | Nonomura et al. |
| 6,047,100 A | 4/2000 | McLaren |
| 6,058,240 A | 5/2000 | McLaren |
| 6,064,794 A | 5/2000 | McLaren et al. |
| 6,065,050 A | 5/2000 | DeMoney |
| 6,018,611 A | 6/2000 | Nogami et al. |
| 6,079,566 A | 6/2000 | Eleftheriadis et al. |
| 6,097,877 A | 8/2000 | Katayama et al. |
| 6,141,754 A | 10/2000 | Choy |
| 6,155,840 A | 12/2000 | Sallette |
| 6,169,242 B1 | 1/2001 | Fay et al. |
| 6,175,921 B1 | 1/2001 | Rosen |
| 6,195,388 B1 | 2/2001 | Choi et al. |
| 6,204,883 B1 | 3/2001 | Tsukagoshi |
| 6,222,981 B1 | 4/2001 | Rijckaert |
| 6,282,653 B1 | 8/2001 | Berstis et al. |
| 6,289,450 B1 | 9/2001 | Pensak et al. |
| 6,292,621 B1 | 9/2001 | Tanaka et al. |
| 6,308,005 B1 | 10/2001 | Ando et al. |
| 6,330,286 B1 | 12/2001 | Lyons et al. |
| 6,374,144 B1 | 4/2002 | Viviani et al. |
| 6,389,218 B2 | 5/2002 | Gordon et al. |
| 6,389,473 B1 | 5/2002 | Carmel et al. |
| 6,395,969 B1 | 5/2002 | Fuhrer |
| 6,397,230 B1 | 5/2002 | Carmel et al. |
| 6,418,270 B1 | 7/2002 | Steenhof et al. |
| 6,449,719 B1 | 9/2002 | Baker |
| 6,466,671 B1 | 10/2002 | Maillard et al. |
| 6,466,733 B1 | 10/2002 | Kim |
| 6,510,513 B1 | 1/2003 | Danieli |
| 6,510,554 B1 | 1/2003 | Gordon et al. |
| 6,621,979 B1 | 9/2003 | Eerenberg et al. |
| 6,625,320 B1 | 9/2003 | Ghanbari |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,697,568 B1 | 2/2004 | Kaku |
| 6,725,281 B1 | 4/2004 | Zintel et al. |
| 6,771,703 B1 | 8/2004 | Oguz et al. |
| 6,807,306 B1 | 10/2004 | Girgensohn et al. |
| 6,810,031 B1 | 10/2004 | Hegde et al. |
| 6,810,389 B1 | 10/2004 | Meyer |
| 6,819,394 B1 | 11/2004 | Nomura et al. |
| 6,850,252 B1 | 2/2005 | Hoffberg |
| 6,856,997 B2 | 2/2005 | Lee et al. |
| 6,859,496 B1 | 2/2005 | Boroczky et al. |
| 6,917,652 B2 | 7/2005 | Lyu |
| 6,931,531 B1 | 8/2005 | Takahashi |
| 6,944,621 B1 | 9/2005 | Collart |
| 6,944,629 B1 | 9/2005 | Shioi et al. |
| 6,956,901 B2 | 10/2005 | Boroczky et al. |
| 6,965,724 B1 | 11/2005 | Boccon-Gibod et al. |
| 6,965,993 B2 | 11/2005 | Baker |
| 6,985,588 B1 | 1/2006 | Glick et al. |
| 6,988,144 B1 | 1/2006 | Luken et al. |
| 7,007,170 B2 | 2/2006 | Morten |
| 7,023,924 B1 | 4/2006 | Keller et al. |
| 7,043,473 B1 | 5/2006 | Rassool et al. |
| 7,103,906 B1 | 9/2006 | Katz et al. |
| 7,127,155 B2 | 10/2006 | Ando et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,185,363 B1 | 2/2007 | Narin et al. |
| 7,197,234 B1 | 3/2007 | Chatterton |
| 7,206,940 B2 | 4/2007 | Evans et al. |
| 7,209,892 B1 | 4/2007 | Galuten et al. |
| 7,231,132 B1 | 6/2007 | Davenport |
| 7,237,061 B1 | 6/2007 | Boic |

(56) References Cited

U.S. PATENT DOCUMENTS

| | | |
|---|---|---|
| 7,242,772 B1 | 7/2007 | Tehranchi |
| 7,243,346 B1 | 7/2007 | Seth et al. |
| 7,295,673 B2 | 11/2007 | Grab et al. |
| 7,328,345 B2 | 2/2008 | Morten et al. |
| 7,330,875 B1 | 2/2008 | Parasnis et al. |
| 7,340,528 B2 | 3/2008 | Noblecourt et al. |
| 7,349,886 B2 | 3/2008 | Morten et al. |
| 7,356,143 B2 | 4/2008 | Morten |
| 7,356,245 B2 | 4/2008 | Belknap et al. |
| 7,366,788 B2 | 4/2008 | Jones et al. |
| 7,376,831 B2 | 5/2008 | Kollmyer et al. |
| 7,406,174 B2 | 7/2008 | Palmer |
| 7,421,411 B2 | 9/2008 | Kontio et al. |
| 7,454,780 B2 | 11/2008 | Katsube et al. |
| 7,457,359 B2 | 11/2008 | Mabey et al. |
| 7,472,280 B2 | 12/2008 | Giobbi |
| 7,478,325 B2 | 1/2009 | Foehr |
| 7,484,103 B2 | 1/2009 | Woo et al. |
| 7,493,018 B2 | 2/2009 | Kim |
| 7,499,938 B2 | 3/2009 | Collart |
| 7,515,710 B2 | 4/2009 | Russell et al. |
| 7,526,450 B2 | 4/2009 | Hughes et al. |
| 7,594,271 B2 | 9/2009 | Zhuk et al. |
| 7,610,365 B1 | 10/2009 | Kraft et al. |
| 7,640,435 B2 | 12/2009 | Morten |
| 7,689,510 B2 | 3/2010 | Lamkin et al. |
| 7,720,352 B2 | 5/2010 | Belknap et al. |
| 7,747,853 B2 | 6/2010 | Candelore et al. |
| 7,761,892 B2 | 7/2010 | Ellis et al. |
| 7,779,097 B2 | 8/2010 | Lamkin et al. |
| 7,788,271 B2 | 8/2010 | Soma et al. |
| 7,817,608 B2 | 10/2010 | Rassool et al. |
| 7,869,691 B2 | 1/2011 | Kelly et al. |
| 7,882,034 B2 | 2/2011 | Hug et al. |
| 7,949,703 B2 | 5/2011 | Matsuzaki et al. |
| 7,962,942 B1 | 6/2011 | Craner |
| 7,974,714 B2 | 7/2011 | Hoffberg |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,069,260 B2 | 11/2011 | Speicher et al. |
| 8,082,442 B2 | 12/2011 | Keljo et al. |
| 8,195,714 B2 | 6/2012 | Mckibben et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,245,124 B1 | 8/2012 | Gupta |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,275,871 B2 | 9/2012 | Ram et al. |
| 8,289,338 B2 | 10/2012 | Priyadarshi et al. |
| 8,291,460 B1 | 10/2012 | Peacock |
| 8,296,434 B1 | 10/2012 | Miller et al. |
| 8,311,111 B2 | 11/2012 | Xu |
| 8,311,115 B2 | 11/2012 | Gu et al. |
| 8,321,556 B1 | 11/2012 | Chatterjee et al. |
| 8,341,715 B2 | 12/2012 | Sherkin et al. |
| 8,386,621 B2 | 2/2013 | Park |
| 8,396,114 B2 | 3/2013 | Gu et al. |
| 8,401,900 B2 | 3/2013 | Cansler et al. |
| 8,407,753 B2 | 3/2013 | Kuo |
| 8,412,841 B1 | 4/2013 | Swaminathan et al. |
| 8,423,889 B1 | 4/2013 | Zagorie et al. |
| 8,452,110 B2 | 5/2013 | Shoham et al. |
| 8,456,380 B2 | 6/2013 | Pagan |
| 8,472,792 B2 | 6/2013 | Butt et al. |
| 8,473,630 B1 | 6/2013 | Galligan et al. |
| 8,510,303 B2 | 8/2013 | Soroushian et al. |
| 8,510,404 B2 | 8/2013 | Carmel et al. |
| 8,515,265 B2 | 8/2013 | Kwon et al. |
| 8,516,529 B2 | 8/2013 | Lajoie et al. |
| 8,527,645 B1 | 9/2013 | Proffit et al. |
| 8,595,378 B1 | 11/2013 | Cohn |
| 8,606,069 B2 | 12/2013 | Okubo et al. |
| 8,640,166 B1 | 1/2014 | Craner et al. |
| 8,649,669 B2 | 2/2014 | Braness et al. |
| 8,656,183 B2 | 2/2014 | Russell et al. |
| 8,677,428 B2 | 3/2014 | Lewis et al. |
| 8,681,866 B1 | 3/2014 | Jia |
| 8,689,267 B2 | 4/2014 | Hunt |
| 8,726,264 B1 | 5/2014 | Allen et al. |
| RE45,052 E | 7/2014 | Li |
| 8,767,825 B1 | 7/2014 | Wang et al. |
| 8,774,609 B2 | 7/2014 | Drake et al. |
| 8,781,122 B2 | 7/2014 | Chan et al. |
| 8,805,109 B2 | 8/2014 | Shoham et al. |
| 8,806,188 B2 | 8/2014 | Braness et al. |
| 8,832,434 B2 | 9/2014 | Apostolopoulos et al. |
| 8,843,586 B2 | 9/2014 | Pantos et al. |
| 8,856,218 B1 | 10/2014 | Inskip |
| 8,908,984 B2 | 12/2014 | Shoham et al. |
| 8,909,922 B2 | 12/2014 | Kiefer et al. |
| 8,914,534 B2 | 12/2014 | Braness et al. |
| 8,914,836 B2 | 12/2014 | Shivadas et al. |
| 8,918,535 B2 | 12/2014 | Ma et al. |
| 8,918,636 B2 | 12/2014 | Kiefer et al. |
| 8,918,908 B2 | 12/2014 | Ziskind et al. |
| 8,948,249 B2 | 2/2015 | Sun et al. |
| 8,997,161 B2 | 3/2015 | Priyadarshi et al. |
| 8,997,254 B2 | 3/2015 | Amidei et al. |
| 9,014,471 B2 | 4/2015 | Shoham et al. |
| 9,025,659 B2 | 5/2015 | Soroushian et al. |
| 9,042,670 B2 | 5/2015 | Carmel et al. |
| 9,060,207 B2 | 6/2015 | Scherkus et al. |
| 9,094,737 B2 | 7/2015 | Shivadas et al. |
| 9,098,335 B2 | 8/2015 | Muthiah et al. |
| 9,124,773 B2 | 9/2015 | Chan et al. |
| 9,125,073 B2 | 9/2015 | Oyman et al. |
| 9,184,920 B2 | 11/2015 | Grab et al. |
| 9,191,457 B2 | 11/2015 | Van der Schaar |
| 9,197,685 B2 | 11/2015 | Soroushian |
| 9,203,816 B2 | 12/2015 | Brueck et al. |
| 9,210,481 B2 | 12/2015 | Braness et al. |
| 9,215,466 B2 | 12/2015 | Zhai et al. |
| 9,247,311 B2 | 1/2016 | Kiefer |
| 9,247,312 B2 | 1/2016 | Braness et al. |
| 9,247,317 B2 | 1/2016 | Shivadas et al. |
| 9,253,178 B2 | 2/2016 | Blom et al. |
| 9,264,475 B2 | 2/2016 | Shivadas et al. |
| 9,294,531 B2 | 3/2016 | Zhang et al. |
| 9,313,510 B2 | 4/2016 | Shivadas et al. |
| 9,343,112 B2 | 5/2016 | Amidei et al. |
| 9,344,517 B2 | 5/2016 | Shivadas et al. |
| 9,344,721 B2 | 5/2016 | Dikvall |
| 9,479,805 B2 | 10/2016 | Rothschild et al. |
| 9,485,546 B2 | 11/2016 | Chen et al. |
| 9,571,827 B2 | 2/2017 | Su et al. |
| 9,584,557 B2 | 2/2017 | Panje et al. |
| 9,584,847 B2 | 2/2017 | Ma et al. |
| 9,621,522 B2 | 4/2017 | Kiefer et al. |
| 9,706,259 B2 | 7/2017 | Chan et al. |
| 9,712,890 B2 | 7/2017 | Shivadas et al. |
| 9,798,863 B2 | 10/2017 | Grab et al. |
| 9,813,740 B2 | 11/2017 | Panje et al. |
| 9,866,878 B2 | 1/2018 | van der Schaar et al. |
| 9,883,204 B2 | 1/2018 | Braness et al. |
| 9,906,785 B2 | 2/2018 | Naletov et al. |
| 9,967,189 B2 | 5/2018 | Patel et al. |
| 9,967,305 B2 | 5/2018 | Braness |
| 2001/0030710 A1 | 10/2001 | Werner |
| 2001/0036355 A1 | 11/2001 | Kelly et al. |
| 2001/0046299 A1 | 11/2001 | Wasilewski et al. |
| 2001/0053222 A1* | 12/2001 | Wakao .......... H04N 21/234318 380/43 |
| 2002/0026560 A1 | 2/2002 | Jordan et al. |
| 2002/0034252 A1 | 3/2002 | Owen et al. |
| 2002/0051494 A1 | 5/2002 | Yamaguchi et al. |
| 2002/0057898 A1 | 5/2002 | Normile |
| 2002/0062313 A1 | 5/2002 | Lee et al. |

(56) References Cited

U.S. PATENT DOCUMENTS

| | | |
|---|---|---|
| 2002/0076112 A1 | 6/2002 | Devara |
| 2002/0087569 A1 | 7/2002 | Fischer et al. |
| 2002/0091665 A1 | 7/2002 | Van Beek et al. |
| 2002/0093571 A1 | 7/2002 | Hyodo |
| 2002/0110193 A1 | 8/2002 | Yoo et al. |
| 2002/0116481 A1 | 8/2002 | Lee |
| 2002/0118953 A1 | 8/2002 | Kim |
| 2002/0120934 A1 | 8/2002 | Abrahams et al. |
| 2002/0136298 A1 | 9/2002 | Anantharamu et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0159598 A1 | 10/2002 | Rubinstein et al. |
| 2002/0161462 A1 | 10/2002 | Fay et al. |
| 2002/0180929 A1 | 12/2002 | Tseng et al. |
| 2002/0184159 A1 | 12/2002 | Tayadon et al. |
| 2002/0184515 A1 | 12/2002 | Oho et al. |
| 2002/0191112 A1 | 12/2002 | Akiyoshi et al. |
| 2002/0191959 A1 | 12/2002 | Lin et al. |
| 2002/0191960 A1 | 12/2002 | Fujinami et al. |
| 2003/0001964 A1 | 1/2003 | Masukura et al. |
| 2003/0002578 A1 | 1/2003 | Tsukagoshi et al. |
| 2003/0005442 A1 | 1/2003 | Brodersen et al. |
| 2003/0021296 A1 | 1/2003 | Wee et al. |
| 2003/0031178 A1 | 2/2003 | Haeri |
| 2003/0035488 A1 | 2/2003 | Barrau |
| 2003/0035545 A1 | 2/2003 | Jiang |
| 2003/0035546 A1 | 2/2003 | Jiang et al. |
| 2003/0041257 A1* | 2/2003 | Wee ............... H04N 7/167 713/193 |
| 2003/0061305 A1 | 3/2003 | Copley et al. |
| 2003/0061369 A1 | 3/2003 | Aksu et al. |
| 2003/0065777 A1 | 4/2003 | Mattila et al. |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0152370 A1 | 8/2003 | Otomo et al. |
| 2003/0163824 A1 | 8/2003 | Gordon et al. |
| 2003/0165328 A1 | 9/2003 | Grecia |
| 2003/0174844 A1 | 9/2003 | Candelore |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0006701 A1 | 1/2004 | Kresina |
| 2004/0021684 A1 | 2/2004 | Millner |
| 2004/0024688 A1 | 2/2004 | Bi et al. |
| 2004/0025180 A1 | 2/2004 | Begeja et al. |
| 2004/0031058 A1 | 2/2004 | Reisman |
| 2004/0039916 A1 | 2/2004 | Aldis et al. |
| 2004/0047614 A1 | 3/2004 | Green |
| 2004/0052501 A1 | 3/2004 | Tam |
| 2004/0071453 A1 | 4/2004 | Valderas |
| 2004/0081333 A1* | 4/2004 | Grab ............... H04K 1/00 382/100 |
| 2004/0081434 A1 | 4/2004 | Jung et al. |
| 2004/0084035 A1 | 5/2004 | Newton |
| 2004/0093618 A1 | 5/2004 | Baldwin et al. |
| 2004/0105549 A1 | 6/2004 | Suzuki et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0139335 A1 | 7/2004 | Diamand et al. |
| 2004/0143760 A1 | 7/2004 | Alkove et al. |
| 2004/0146276 A1 | 7/2004 | Ogawa |
| 2004/0158878 A1 | 8/2004 | Ratnakar et al. |
| 2004/0184534 A1 | 9/2004 | Wang |
| 2004/0184616 A1 | 9/2004 | Morten et al. |
| 2004/0202320 A1 | 10/2004 | Amini et al. |
| 2004/0217971 A1 | 11/2004 | Kim |
| 2004/0255115 A1 | 12/2004 | DeMello et al. |
| 2004/0255236 A1 | 12/2004 | Collart |
| 2005/0004875 A1 | 1/2005 | Kontio et al. |
| 2005/0005025 A1 | 1/2005 | Harville et al. |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0071280 A1 | 3/2005 | Irwin et al. |
| 2005/0108320 A1 | 5/2005 | Lord et al. |
| 2005/0114534 A1 | 5/2005 | Lee |
| 2005/0114896 A1 | 5/2005 | Hug |
| 2005/0132208 A1 | 6/2005 | Hug et al. |
| 2005/0149450 A1 | 7/2005 | Stefik et al. |
| 2005/0180641 A1 | 8/2005 | Clark |
| 2005/0183120 A1 | 8/2005 | Jain et al. |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0204289 A1 | 9/2005 | Mohammed et al. |
| 2005/0207442 A1 | 9/2005 | van Zoest et al. |
| 2005/0207578 A1 | 9/2005 | Matsuyama et al. |
| 2005/0254508 A1 | 11/2005 | Aksu et al. |
| 2005/0273695 A1 | 12/2005 | Schnurr |
| 2005/0275656 A1 | 12/2005 | Corbin et al. |
| 2006/0015580 A1 | 1/2006 | Gabriel et al. |
| 2006/0026294 A1 | 2/2006 | Virdi et al. |
| 2006/0026302 A1 | 2/2006 | Bennett et al. |
| 2006/0036549 A1 | 2/2006 | Wu |
| 2006/0037057 A1 | 2/2006 | Xu |
| 2006/0052095 A1 | 3/2006 | Vazvan |
| 2006/0053080 A1 | 3/2006 | Edmonson et al. |
| 2006/0064605 A1 | 3/2006 | Giobbi |
| 2006/0078301 A1 | 4/2006 | Ikeda et al. |
| 2006/0093320 A1 | 5/2006 | Hallberg et al. |
| 2006/0120378 A1 | 6/2006 | Usuki et al. |
| 2006/0129909 A1 | 6/2006 | Butt et al. |
| 2006/0165233 A1 | 7/2006 | Nonaka et al. |
| 2006/0168639 A1 | 7/2006 | Gan et al. |
| 2006/0173887 A1 | 8/2006 | Breitfeld et al. |
| 2006/0179239 A1 | 8/2006 | Fluhr |
| 2006/0181965 A1 | 8/2006 | Collart |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2006/0294164 A1 | 12/2006 | Armangau et al. |
| 2007/0005333 A1 | 1/2007 | Setiohardjo et al. |
| 2007/0031110 A1 | 2/2007 | Rijckaert |
| 2007/0033419 A1 | 2/2007 | Kocher et al. |
| 2007/0044010 A1 | 2/2007 | Sull et al. |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0133603 A1 | 6/2007 | Weaver |
| 2007/0136817 A1 | 6/2007 | Nguyen |
| 2007/0140647 A1 | 6/2007 | Kusunoki et al. |
| 2007/0154165 A1 | 7/2007 | Hemmeryckz-Deleersnijder et al. |
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180125 A1 | 8/2007 | Knowles et al. |
| 2007/0185982 A1 | 8/2007 | Nakanowatari et al. |
| 2007/0192810 A1 | 8/2007 | Pritchett et al. |
| 2007/0217339 A1 | 9/2007 | Zhao |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0255940 A1* | 11/2007 | Ueno ............... H04K 1/00 713/150 |
| 2007/0271317 A1 | 11/2007 | Carmel et al. |
| 2007/0271385 A1 | 11/2007 | Davis et al. |

(56) References Cited

U.S. PATENT DOCUMENTS

| | | |
|---|---|---|
| 2007/0274679 A1 | 11/2007 | Yahata et al. |
| 2007/0277219 A1 | 11/2007 | Toebes et al. |
| 2007/0277234 A1 | 11/2007 | Bessonov et al. |
| 2007/0280298 A1 | 12/2007 | Hearn et al. |
| 2007/0288745 A1* | 12/2007 | Kwan .............. H04L 9/0822 713/155 |
| 2007/0292107 A1 | 12/2007 | Yahata et al. |
| 2007/0297422 A1 | 12/2007 | Matsuo et al. |
| 2008/0005175 A1 | 1/2008 | Bourke et al. |
| 2008/0008455 A1 | 1/2008 | De Lange et al. |
| 2008/0043832 A1 | 2/2008 | Barkley et al. |
| 2008/0046718 A1 | 2/2008 | Grab |
| 2008/0066099 A1 | 3/2008 | Brodersen et al. |
| 2008/0066181 A1 | 3/2008 | Haveson et al. |
| 2008/0077592 A1 | 3/2008 | Brodie et al. |
| 2008/0086456 A1 | 4/2008 | Rasanen et al. |
| 2008/0086747 A1 | 4/2008 | Rasanen et al. |
| 2008/0101466 A1 | 5/2008 | Swenson et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0120389 A1 | 5/2008 | Bassali et al. |
| 2008/0126248 A1 | 5/2008 | Lee et al. |
| 2008/0137541 A1 | 6/2008 | Agarwal |
| 2008/0137736 A1 | 6/2008 | Richardson |
| 2008/0151817 A1 | 6/2008 | Fitchett |
| 2008/0172441 A1 | 7/2008 | Speicher et al. |
| 2008/0187283 A1 | 8/2008 | Takahashi |
| 2008/0192818 A1 | 8/2008 | DiPietro et al. |
| 2008/0195664 A1 | 8/2008 | Mharajh et al. |
| 2008/0195744 A1 | 8/2008 | Bwra et al. |
| 2008/0201705 A1 | 8/2008 | Wookey |
| 2008/0205860 A1 | 8/2008 | Hltman |
| 2008/0209534 A1 | 8/2008 | Keronen et al. |
| 2008/0240144 A1 | 10/2008 | Krse et al. |
| 2008/0256105 A1 | 10/2008 | Nogwa et al. |
| 2008/0263354 A1 | 10/2008 | Beuque et al. |
| 2008/0279535 A1 | 11/2008 | Haque et al. |
| 2008/0294453 A1 | 11/2008 | Baid-Smith et al. |
| 2008/0298358 A1 | 12/2008 | John et al. |
| 2008/0310454 A1 | 12/2008 | Belwood et al. |
| 2008/0310496 A1 | 12/2008 | Fan |
| 2009/0031220 A1 | 1/2009 | Tranchnt et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0064341 A1 | 3/2009 | Hartung et al. |
| 2009/0066839 A1 | 3/2009 | Jung et al. |
| 2009/0097644 A1* | 4/2009 | Haruki ............ G11B 20/00086 380/200 |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0165148 A1 | 6/2009 | Frey et al. |
| 2009/0168795 A1 | 7/2009 | Segel et al. |
| 2009/0169181 A1 | 7/2009 | Priyadarshi et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0217317 A1 | 8/2009 | White et al. |
| 2009/0226148 A1 | 9/2009 | Nesvadba et al. |
| 2009/0228395 A1 | 9/2009 | Wegner et al. |
| 2009/0265737 A1 | 10/2009 | Issa et al. |
| 2009/0276636 A1 | 11/2009 | Grab et al. |
| 2009/0290706 A1 | 11/2009 | Amini et al. |
| 2009/0290708 A1 | 11/2009 | Schneider et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310819 A1 | 12/2009 | Hatano |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0040351 A1 | 2/2010 | Toma et al. |
| 2010/0057928 A1 | 3/2010 | Kapoor et al. |
| 2010/0058405 A1 | 3/2010 | Ramakrishnan et al. |
| 2010/0074324 A1 | 3/2010 | Qian et al. |
| 2010/0074333 A1 | 3/2010 | Au et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0106968 A1 | 4/2010 | Mori et al. |
| 2010/0107260 A1 | 4/2010 | Orrell et al. |
| 2010/0111192 A1 | 5/2010 | Graves |
| 2010/0138903 A1 | 6/2010 | Medvinsky |
| 2010/0142917 A1 | 6/2010 | Isaji |
| 2010/0158109 A1 | 6/2010 | Dahlby et al. |
| 2010/0161825 A1 | 6/2010 | Ronca et al. |
| 2010/0166060 A1 | 7/2010 | Ezure et al. |
| 2010/0186092 A1 | 7/2010 | Takechi et al. |
| 2010/0189183 A1 | 7/2010 | Gu et al. |
| 2010/0218208 A1 | 8/2010 | Holden |
| 2010/0228795 A1 | 9/2010 | Hahn |
| 2010/0235472 A1 | 9/2010 | Sood et al. |
| 2010/0250532 A1 | 9/2010 | Soroushian et al. |
| 2010/0290761 A1 | 11/2010 | Drake et al. |
| 2010/0299522 A1 | 11/2010 | Khambete et al. |
| 2010/0306249 A1 | 12/2010 | Hill et al. |
| 2010/0313225 A1 | 12/2010 | Cholas et al. |
| 2010/0313226 A1 | 12/2010 | Cholas et al. |
| 2010/0319014 A1 | 12/2010 | Lockett et al. |
| 2010/0319017 A1 | 12/2010 | Cook |
| 2010/0332595 A1 | 12/2010 | Fullagar et al. |
| 2011/0002381 A1 | 1/2011 | Yang et al. |
| 2011/0016225 A1 | 1/2011 | Park |
| 2011/0047209 A1 | 2/2011 | Lindholm et al. |
| 2011/0055585 A1 | 3/2011 | Lee |
| 2011/0060808 A1 | 3/2011 | Martin et al. |
| 2011/0066673 A1 | 3/2011 | Outlaw |
| 2011/0067057 A1 | 3/2011 | Karaoguz et al. |
| 2011/0078440 A1 | 3/2011 | Feng et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0107379 A1 | 5/2011 | Lajoie et al. |
| 2011/0116772 A1 | 5/2011 | Kwon et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0153835 A1 | 6/2011 | Rimac et al. |
| 2011/0184738 A1 | 7/2011 | Kalisky et al. |
| 2011/0191439 A1 | 8/2011 | Dazzi et al. |
| 2011/0191803 A1 | 8/2011 | Baldwin et al. |
| 2011/0197237 A1 | 8/2011 | Turner |
| 2011/0197267 A1 | 8/2011 | Gravel et al. |
| 2011/0213827 A1 | 9/2011 | Kaspar et al. |
| 2011/0222786 A1 | 9/2011 | Carmel et al. |
| 2011/0225302 A1 | 9/2011 | Park et al. |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0252118 A1 | 10/2011 | Pantos et al. |
| 2011/0264530 A1 | 10/2011 | Santangelo et al. |
| 2011/0268178 A1 | 11/2011 | Park et al. |
| 2011/0276695 A1 | 11/2011 | Maldaner et al. |
| 2011/0283012 A1 | 11/2011 | Melnyk |
| 2011/0291723 A1 | 12/2011 | Hashimoto |
| 2011/0302319 A1 | 12/2011 | Ha et al. |

(56) References Cited

U.S. PATENT DOCUMENTS

| | | |
|---|---|---|
| 2011/0305273 A1 | 12/2011 | He et al. |
| 2011/0314176 A1 | 12/2011 | Frojdh et al. |
| 2011/0314500 A1 | 12/2011 | Gordon |
| 2012/0005368 A1 | 1/2012 | Knittle et al. |
| 2012/0017282 A1 | 1/2012 | Kang et al. |
| 2012/0023251 A1 | 1/2012 | Pyle et al. |
| 2012/0036365 A1 | 2/2012 | Kyslov et al. |
| 2012/0036544 A1 | 2/2012 | Chen et al. |
| 2012/0066360 A1 | 3/2012 | Ghosh |
| 2012/0093214 A1 | 4/2012 | Urbach |
| 2012/0114302 A1 | 5/2012 | Randall et al. |
| 2012/0124191 A1 | 5/2012 | Lyon |
| 2012/0137336 A1 | 5/2012 | Applegate et al. |
| 2012/0144117 A1 | 6/2012 | Weare et al. |
| 2012/0144445 A1 | 6/2012 | Bonta et al. |
| 2012/0166633 A1 | 6/2012 | Baumback et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0240176 A1 | 9/2012 | Ma et al. |
| 2012/0254455 A1 | 10/2012 | Adimatyam et al. |
| 2012/0260277 A1 | 10/2012 | Kosciewicz |
| 2012/0263434 A1 | 10/2012 | Wainner et al. |
| 2012/0265562 A1 | 10/2012 | Daouk et al. |
| 2012/0278496 A1 | 11/2012 | Hsu |
| 2012/0289147 A1 | 11/2012 | Raleigh et al. |
| 2012/0294355 A1 | 11/2012 | Holcomb et al. |
| 2012/0297039 A1 | 11/2012 | Acuna et al. |
| 2012/0307883 A1 | 12/2012 | Graves |
| 2012/0311094 A1 | 12/2012 | Biderman et al. |
| 2012/0314778 A1 | 12/2012 | Salustri et al. |
| 2012/0317235 A1 | 12/2012 | Nguyen et al. |
| 2013/0007223 A1 | 1/2013 | Luby et al. |
| 2013/0013730 A1 | 1/2013 | Li et al. |
| 2013/0019107 A1 | 1/2013 | Grab et al. |
| 2013/0019273 A1 | 1/2013 | Ma et al. |
| 2013/0041808 A1 | 2/2013 | Pham et al. |
| 2013/0044821 A1 | 2/2013 | Braness et al. |
| 2013/0046849 A1 | 2/2013 | Wolf |
| 2013/0046902 A1 | 2/2013 | Villegas Nuñez et al. |
| 2013/0051554 A1 | 2/2013 | Braness et al. |
| 2013/0054958 A1 | 2/2013 | Braness et al. |
| 2013/0055084 A1 | 2/2013 | Soroushian et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |
| 2013/0066838 A1 | 3/2013 | Singla et al. |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0124859 A1 | 5/2013 | Pestoni et al. |
| 2013/0128962 A1 | 5/2013 | Rajagopalan et al. |
| 2013/0152767 A1 | 6/2013 | Katz et al. |
| 2013/0166580 A1 | 6/2013 | Maharajh |
| 2013/0166765 A1 | 6/2013 | Kaufman |
| 2013/0166906 A1 | 6/2013 | Swaminathan et al. |
| 2013/0170561 A1 | 7/2013 | Hannuksela |
| 2013/0170764 A1 | 7/2013 | Carmel et al. |
| 2013/0173513 A1 | 7/2013 | Chu et al. |
| 2013/0179199 A1 | 7/2013 | Ziskind et al. |
| 2013/0179992 A1 | 7/2013 | Ziskind et al. |
| 2013/0182952 A1 | 7/2013 | Carmel et al. |
| 2013/0196292 A1 | 8/2013 | Brennen et al. |
| 2013/0212228 A1 | 8/2013 | Butler |
| 2013/0223812 A1 | 8/2013 | Rossi |
| 2013/0226578 A1 | 8/2013 | Bolton et al. |
| 2013/0226635 A1 | 8/2013 | Fisher |
| 2013/0227081 A1 | 8/2013 | Luby et al. |
| 2013/0227122 A1 | 8/2013 | Gao |
| 2013/0301424 A1 | 11/2013 | Kotecha et al. |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0019593 A1 | 1/2014 | Reznik et al. |
| 2014/0037620 A1 | 2/2014 | Ferree et al. |
| 2014/0052823 A1 | 2/2014 | Gavade et al. |
| 2014/0059156 A1 | 2/2014 | Freeman, II et al. |
| 2014/0096171 A1 | 4/2014 | Shivadas et al. |
| 2014/0101722 A1 | 4/2014 | Moore |
| 2014/0115650 A1 | 4/2014 | Zhang et al. |
| 2014/0119432 A1 | 5/2014 | Wang et al. |
| 2014/0140396 A1 | 5/2014 | Wang et al. |
| 2014/0140417 A1 | 5/2014 | Shaffer et al. |
| 2014/0143301 A1 | 5/2014 | Watson et al. |
| 2014/0143431 A1 | 5/2014 | Watson et al. |
| 2014/0143440 A1 | 5/2014 | Ramamurthy et al. |
| 2014/0177734 A1 | 6/2014 | Carmel et al. |
| 2014/0189065 A1 | 7/2014 | van der Schaar et al. |
| 2014/0201382 A1 | 7/2014 | Shivadas et al. |
| 2014/0211840 A1 | 7/2014 | Butt et al. |
| 2014/0211859 A1 | 7/2014 | Carmel et al. |
| 2014/0241420 A1 | 8/2014 | Orton-jay et al. |
| 2014/0241421 A1 | 8/2014 | Orton-jay et al. |
| 2014/0247869 A1 | 9/2014 | Su |
| 2014/0250473 A1 | 9/2014 | Braness et al. |
| 2014/0258714 A1 | 9/2014 | Grab |
| 2014/0269927 A1 | 9/2014 | Naletov et al. |
| 2014/0269936 A1 | 9/2014 | Shivadas et al. |
| 2014/0280763 A1 | 9/2014 | Grab et al. |
| 2014/0297804 A1 | 10/2014 | Shivadas et al. |
| 2014/0297881 A1 | 10/2014 | Shivadas et al. |
| 2014/0355668 A1 | 12/2014 | Shoham et al. |
| 2014/0359678 A1 | 12/2014 | Shivadas et al. |
| 2014/0359679 A1 | 12/2014 | Shivadas et al. |
| 2014/0359680 A1 | 12/2014 | Shivadas et al. |
| 2014/0376720 A1 | 12/2014 | Chan et al. |
| 2015/0006662 A1 | 1/2015 | Braness |
| 2015/0026677 A1 | 1/2015 | Stevens et al. |
| 2015/0049957 A1 | 2/2015 | Shoham et al. |
| 2015/0063693 A1 | 3/2015 | Carmel et al. |
| 2015/0067715 A1 | 3/2015 | Koat et al. |
| 2015/0104153 A1 | 4/2015 | Braness et al. |
| 2015/0117836 A1 | 4/2015 | Amidei et al. |
| 2015/0117837 A1 | 4/2015 | Amidei et al. |
| 2015/0139419 A1 | 5/2015 | Kiefer et al. |
| 2015/0188758 A1 | 7/2015 | Amidei et al. |
| 2015/0188842 A1 | 7/2015 | Amidei et al. |
| 2015/0188921 A1 | 7/2015 | Amidei et al. |
| 2015/0189017 A1 | 7/2015 | Amidei et al. |
| 2015/0189373 A1 | 7/2015 | Amidei et al. |
| 2015/0288996 A1 | 10/2015 | Van Der Schaar et al. |
| 2015/0334435 A1 | 11/2015 | Shivadas et al. |
| 2015/0373421 A1* | 12/2015 | Chan ............... H04N 21/2351 380/239 |
| 2016/0070890 A1 | 3/2016 | Grab et al. |
| 2016/0112382 A1 | 4/2016 | Kiefer et al. |
| 2016/0149981 A1 | 5/2016 | Shivadas et al. |
| 2016/0219303 A1 | 7/2016 | Braness et al. |
| 2017/0214947 A1 | 7/2017 | Kiefer et al. |
| 2018/0007451 A1 | 1/2018 | Shivadas et al. |
| 2018/0060543 A1 | 3/2018 | Grab et al. |
| 2018/0131980 A1 | 5/2018 | Van Der Schaar et al. |
| 2018/0220153 A1 | 8/2018 | Braness et al. |

FOREIGN PATENT DOCUMENTS

| | | |
|---|---|---|
| CN | 1221284 A | 6/1999 |
| CN | 1723696 | 1/2006 |
| EP | 757484 A2 | 2/1997 |
| EP | 813167 A2 | 12/1997 |
| EP | 0936812 A1 | 8/1999 |
| EP | 1056273 A2 | 11/2000 |
| EP | 1187483 A2 | 3/2002 |
| EP | 1420580 A1 | 5/2004 |
| EP | 1553779 A1 | 7/2005 |
| EP | 1657835 A1 | 5/2006 |

(56) References Cited

FOREIGN PATENT DOCUMENTS

| | | |
|---|---|---|
| EP | 1718074 A1 | 11/2006 |
| EP | 2486517 A1 | 8/2012 |
| EP | 2486727 A1 | 8/2012 |
| EP | 2507995 A1 | 10/2012 |
| EP | 2564354 A1 | 3/2013 |
| EP | 2616991 | 7/2013 |
| EP | 2617192 | 7/2013 |
| EP | 2661696 A1 | 11/2013 |
| EP | 2661875 A1 | 11/2013 |
| EP | 2661895 A2 | 11/2013 |
| EP | 2486727 A4 | 3/2014 |
| EP | 2564354 A4 | 3/2014 |
| EP | 2616991 A4 | 3/2014 |
| EP | 2617192 A4 | 3/2014 |
| EP | 2716048 A1 | 4/2014 |
| EP | 2721826 A1 | 4/2014 |
| EP | 2486517 | 6/2014 |
| EP | 2751990 | 7/2014 |
| EP | 2807821 | 12/2014 |
| EP | 2751990 A1 | 4/2015 |
| HK | 1125765 A | 8/2009 |
| JP | 08046902 A | 2/1996 |
| JP | 8111842 A | 4/1996 |
| JP | 08163488 | 6/1996 |
| JP | 08287613 A | 11/1996 |
| JP | 09037225 A | 2/1997 |
| JP | 11164307 A | 6/1999 |
| JP | 11275576 A | 10/1999 |
| JP | 11328929 A | 11/1999 |
| JP | 2000201343 A | 7/2000 |
| JP | 02001043668 A | 2/2001 |
| JP | 2001209726 A | 8/2001 |
| JP | 2001346165 A | 12/2001 |
| JP | 2002164880 A | 6/2002 |
| JP | 2002170363 | 6/2002 |
| JP | 2002170363 A | 6/2002 |
| JP | 2002518898 A | 6/2002 |
| JP | 2002218384 A | 8/2002 |
| JP | 2003179597 A | 6/2003 |
| JP | 2003250113 A | 9/2003 |
| JP | 2004013823 A | 1/2004 |
| JP | 2004515941 A | 5/2004 |
| JP | 2004172830 A | 6/2004 |
| JP | 2004187161 A | 7/2004 |
| JP | 2004234128 A | 8/2004 |
| JP | 2005027153 | 1/2005 |
| JP | 2005080204 A | 3/2005 |
| JP | 2006155500 A | 6/2006 |
| JP | 2006524007 A | 10/2006 |
| JP | 2007036666 A | 2/2007 |
| JP | 2007174375 A | 7/2007 |
| JP | 2007235690 A | 9/2007 |
| JP | 2007535881 A | 12/2007 |
| JP | 2008235999 A | 10/2008 |
| JP | 2009530917 A | 8/2009 |
| JP | 5200204 B2 | 6/2013 |
| JP | 2014506430 A | 3/2014 |
| JP | 5723888 B2 | 4/2015 |
| JP | 6038805 B2 | 12/2016 |
| JP | 6078574 B2 | 1/2017 |
| JP | 2017063453 | 3/2017 |
| KR | 100221423 B1 | 6/1999 |
| KR | 100221423 | 9/1999 |
| KR | 2002013664 | 2/2002 |
| KR | 1020020064888 A | 8/2002 |
| KR | 100669616 | 9/2007 |
| KR | 1020130133830 | 12/2013 |
| KR | 101874907 B1 | 7/2018 |
| SG | 146026 | 12/2010 |
| WO | 1995015660 A1 | 6/1995 |
| WO | 1996013121 | 5/1996 |
| WO | 1997031445 A3 | 4/1998 |
| WO | 1999010836 A1 | 3/1999 |
| WO | 1999065239 A2 | 12/1999 |
| WO | 0104892 A1 | 1/2001 |
| WO | 2001031497 A1 | 5/2001 |
| WO | 2001050732 A2 | 7/2001 |
| WO | 2001065762 A2 | 9/2001 |
| WO | 2002001880 A1 | 1/2002 |
| WO | 2002008948 A2 | 1/2002 |
| WO | 2002035832 A2 | 5/2002 |
| WO | 2002037210 A2 | 5/2002 |
| WO | 2002054196 A2 | 7/2002 |
| WO | 2003030000 A1 | 4/2003 |
| WO | 2003096136 A2 | 11/2003 |
| WO | 2004054247 A1 | 6/2004 |
| WO | 2004097811 A1 | 11/2004 |
| WO | 2004102571 A1 | 11/2004 |
| WO | 2006018843 A2 | 2/2006 |
| WO | 2006018843 A3 | 12/2006 |
| WO | 2007044590 A2 | 4/2007 |
| WO | 2007113836 A2 | 10/2007 |
| WO | 2008010275 A1 | 1/2008 |
| WO | 2008042242 A2 | 4/2008 |
| WO | 2008086313 A1 | 7/2008 |
| WO | 2007113836 A3 | 11/2008 |
| WO | 2008135932 A2 | 11/2008 |
| WO | 2007113836 B1 | 12/2008 |
| WO | 2009065137 A1 | 5/2009 |
| WO | 2010060106 A1 | 5/2010 |
| WO | 2010080911 A1 | 7/2010 |
| WO | 2010089962 A1 | 8/2010 |
| WO | 2010108053 A1 | 9/2010 |
| WO | 2010111261 A1 | 9/2010 |
| WO | 2010122447 A1 | 10/2010 |
| WO | 2010147878 A1 | 12/2010 |
| WO | 2011042898 A1 | 4/2011 |
| WO | 2011042900 A1 | 4/2011 |
| WO | 2011068668 A1 | 6/2011 |
| WO | 2011103364 A1 | 8/2011 |
| WO | 2011132184 A1 | 10/2011 |
| WO | 2011135558 A1 | 11/2011 |
| WO | 2012035533 A2 | 3/2012 |
| WO | 2012035534 A2 | 3/2012 |
| WO | 2012035534 A3 | 7/2012 |
| WO | 2012094171 A1 | 7/2012 |
| WO | 2012094181 A2 | 7/2012 |
| WO | 2012094189 A1 | 7/2012 |
| WO | 20120094181 A2 | 7/2012 |
| WO | 20120094189 A1 | 7/2012 |
| WO | 2012035533 A3 | 8/2012 |
| WO | 2012162806 A1 | 12/2012 |
| WO | 2012171113 A1 | 12/2012 |
| WO | 2013030833 A1 | 3/2013 |
| WO | 2013032518 A2 | 3/2013 |
| WO | 2013103986 A2 | 7/2013 |
| WO | 2013111126 A2 | 8/2013 |
| WO | 2013111126 A3 | 8/2013 |
| WO | 2013032518 A3 | 9/2013 |
| WO | 2013144942 A1 | 10/2013 |
| WO | 2014145901 A1 | 9/2014 |
| WO | 2014193996 A2 | 12/2014 |
| WO | 2014193996 A3 | 2/2015 |
| WO | 2015031982 A1 | 3/2015 |

OTHER PUBLICATIONS

Windows Media Center Extender for Xbox, printed May 9, 2007 from http://www.xbox.com/en-US/support/systemuse/xbox/console/mediacenterextender.htm, 2 pgs.

Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.

"Adaptive Streaming Comparison", Jan. 28, 2010, 5 pgs.

"Best Practices for Multi-Device Transcoding", Kaltura Open Source Video, Printed on Nov. 27, 2013 from knowledge.kaltura.com/best-practices-multi-device-transcoding, 13 pgs.

"Container format (digital)", printed Aug. 22, 2009 from http://en.wikipedia.org/wiki/Container_format_(digital), 4 pgs.

"Diagram | Matroska", Dec. 17, 2010, Retrieved from http://web.archive.org/web/201 01217114656/http:I/matroska.org/technical/diagram/index.html on Jan. 29, 2016, 5 pages, Dec. 17, 2010.

(56) References Cited

OTHER PUBLICATIONS

"DVD—MPeg differences", printed Jul. 2, 2009 from http://dvd.sourceforge.net/dvdinfo/dvdmpeg/html, 1 pg.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for...-a018239381, 6pg.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Innovation of technology arrived", Retrieved from http://www.iodata.com/catalogs/AVLP2DVDLA_Flyer200505.pdf on May 30, 2013, 2 pgs., I-O Data, 2 pgs.
"KISS Players, KISS DP-500", retrieved from http://www.kiss-technology.com/?p=dp500 on May 4, 2007, 1 pg.
"Matroska Streaming | Matroska", Retrieved from the Internet: URL:http://web.archive.org/web/20101217114310/http://matroska.org/technical!streaming/index.html [retrieved on Jan. 29, 2016], Dec. 17, 2010.
"Netflix turns on subtitles for PC, Mac streaming", Yahoo! News, Apr. 21, 2010, Printed on Mar. 26, 2014, 3 pgs.
"OpenDML AVI File Format Extensions", OpenDML AVI M-JPEG File Format Subcommittee, retrieved from www.the-labs.com/Video/odmlff2-avidef.pdf, Sep. 1997, 42 pgs.
"QCast Tuner for PS2, printed May 11, 2009 from http://web.archive.org/web/20030210120605/www.divx.com/software/detail.php?ie=39, 2 pgs".
"Smooth Streaming Client", The Official Microsoft IIS Site, Sep. 24, 2010, 4 pages.
"Specifications | Matroska", Retrieved from the Internet: URL:http://web.archive.org/web/201 00706041303/http:/1www.matroska.org/technical/specs/index.html [retrieved on Jan. 29, 2016, Jul. 6, 2010.
"Supplementary European Search Report for Application No. EP 10834935, International Filing Date Nov. 15, 2010, Search Completed May 27, 2014, 9 pgs."
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, http://developer.apple.com/library/ios#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
U.S. Appl. No. 13/224,298, "Final Office Action Received", dated May 19, 2014, 26 pgs.
U.S. Appl. No. 13/905,804, "Non-Final Office Action Received", dated Jul. 25, 2014, 14 pgs.
Akhshabi et al., "An Experimental Evaluation of Rate-Adaptation Algorithms in Adaptive Streaming over HTTP", MMSys'11, Feb. 23-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standard ISO/IEC 14496-2", Patni Computer Systems, Ltd., printed Jan. 24, 2007, USA, pp. 1-15.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc.: 1999 (month unknown), 6 pages.
Author Unknown, "Turbo-Charge Your Internet and PC Performance", printed Oct. 30, 2008 from Speedtest.net—The Global Broadband Speed Test, 1 pg.
Author Unknown, "When is 54 Not Equal to 54? A Look at 802.11a, b and g Throughput", printed Oct. 30, 2008 from www.oreillynet.com/pub/a/wireless/2003/08/08/wireless_throughput.html, 4 pgs.
Author Unknown, "White paper, The New Mainstream Wireless LAN Standard", Broadcom Corporation, Jul. 2003, 12 pgs.
Blasiak, Video Transrating and Transcoding: Overview of Video Transrating and Transcoding Technologies, Ingenient Technologies, TI Developer Conference, Aug. 6-8, 2002, 22 pgs.
Casares et al., "Simplifying Video Editing Using Metadata", DIS2002, 2002, pp. 157-166.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Garg et al., "An Experimental Study of Throughput for UDP and VoIP Traffic in IEEE 802.11b Networks", Wireless Communications and Networkings, Mar. 2003, pp. 1748-1753.
Ghosh, "Enhancing Silverlight Video Experiences with Contextual Data", Retrieved from: http://msdn.microsoft.com/en-us/magazine/ee336025.aspx, 2010, 15 pgs.
Griffith, Eric, "Wi-Fi Planet, The Wireless Digital Picture Fram Arrives", printed May 4, 2007 from http://www.wi-fiplanet.com/news/article.php/3093141, Oct. 16, 2003, 3 pgs.
Inlet Technologies, "Adaptive Delivery to iDevices", 2010, 2 pages.
Inlet Technologies, "Adaptive delivery to iPhone 3.0", 2009, 2 pgs.
Inlet Technologies, "HTTP versus RTMP", 2009, 3 pages.
Inlet Technologies, "The World's First Live Smooth Streaming Event: The French Open", 2009, 2 pages.
"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pages.
"Information Technology—Coding of Audio Visual Objects—Part 2: Visual" International Standard, ISO/IEC 14496-2, Third Edition, Jun. 1, 2004, pp. 1-724. (presented in three parts).
"OpenDML AVI File Format Extensions," Sep. 1997, Version 1.02, XP-002179318, OpenDML AVI M-JPEG File Format Subcommitee, 42 pgs.
Broadq—The Ultimate Home Entertainment Software, printed May 11, 2009 from ittp://web.srchive.org/web/20030401122010/www.broadq.com/qcasttuner/, 1 pg.

(56) References Cited

OTHER PUBLICATIONS

Cloakware Corporation, "Protecting Digital Content Using Cloakware Code Transformation Technology", Version 1.2, May 2002, pp. 1-10.
European Search Report Application No. EP 08870152, Search Completed May 19, 2011, dated May 26, 2011, 9pgs.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Extended European Search Report for European Application EP10821672, completed Jan. 30, 2014, 3 pgs.
Extended European Search Report for European Application EP11824682, completed Feb. 6, 2014, 4 pgs.
Extended European Search Report for European Application No. 14763140.2, Search completed Sep. 26, 2016, dated Oct. 5, 2016, 9 Pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
InformationWeek, "Internet on Wheels", InformationWeek: Front End: Daily Dose, Jul. 20, 1999, Printed on Mar. 26, 2014, 3 pgs.
International Preliminary Report on Patentability for International Application PCT/US14/30747, Report dated Sep. 15, 2015, dated Sep. 24, 2015, 6 Pgs.
International Preliminary Report on Patentability for International Application No. PCT/US2008/083816, dated May 18, 2010, 6 pgs.
International Preliminary Report on Patentability for International Application No. PCT/US2011/068276, dated Mar. 4, 2014, 23 pgs.
International Preliminary Report on Patentability for International Application PCT/US2013/043181, dated Dec. 31, 2014, dated Jan. 8, 2015, 11 Pgs.
International Preliminary Report on Patentability for International Application PCT/US2014/039852, dated Dec. 1, 2015, dated Dec. 5, 2015, 8 Pgs.
International Search Report and Written Opinion for International Application No. PCT/US08/87999, completed Feb. 7, 2009, dated Mar. 19, 2009, 6 pgs.
International Search Report and Written Opinion for International Application No. PCT/US09/46588, completed Jul. 13, 2009, dated Jul. 23, 2009, 7 pgs.
International Search Report and Written Opinion for International Application No. PCT/US2005/025845, completed Feb. 5, 2007 and dated May 10, 2007, 8 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2010/020372, Completed Feb. 10, 2009, dated Mar. 1, 2010, 8 pgs.
International Search Report and Written Opinion for International Application No. PCT/US2010/56733, Completed Jan. 3, 2011, dated Jan. 14, 2011, 9 pgs.
International Search Report and Written Opinion for International Application No. PCT/US2013/043181, completed Nov. 27, 2013, dated Dec. 6, 2013, 12 pgs.
International Search Report and Written Opinion for International Application PCT/US14/30747, completed Jul. 30, 2014, dated Aug. 22, 2014, 7 Pgs.
International Search Report and Written Opinion for International Application PCT/US14/39852, completed Oct. 21, 2014, dated Dec. 5, 2014, 11 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report and Written Opinion for International Application PCT/US2011/068276, completed Jun. 19, 2013, dated Jul. 8, 2013, 24 pgs.
International Search Report and Written Opinion for PCT/US2013/020572, International Filing Date Jan. 7, 2013, Search Completed Mar. 19, 2013, dated Apr. 29, 2013, 10 pgs.
ITS International, "Fleet System OPTS for Mobile Server", Aug. 26, 1999, Printed on Oct. 21, 2011 from http://www.itsinternational.com/News/article.cfm?recordID=547, 1 page.
Lifehacker—Boxqueue Bookmarklet Saves Videos for Later Boxee Watching, printed Jun. 16, 2009 from http://feeds.gawker.com/~r/lifehacker/full/~3/OHvDmrIgZZc/boxqueue-bookmarklet-saves-videos-for-late-boxee-watching, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
Linksys®: "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p.
Microsoft Corporation, "Chapter 8, Multimedia File Formats" 1991, Microsoft Windows Multimedia Programmer's Reference, 3 cover pgs, pp. 8-1 to 8-20.
Microsoft Media Platform: Player Framework, "Microsoft Media Platform: Player Framework v2.5 (formerly Silverlight Media Framework)", May 3, 2011, 2 pages.
Microsoft Media Platform: Player Framework, "Silverlight Media Framework v1.1", Jan. 2010, 2 pages.
Microsoft Windows® XP Media Center Edition 2005, Frequently asked Questions, printed May 4, 2007 from http://www.microsoft.com/windowsxp/mediacenter/evaluation/faq.mspx.
Microsoft Windows® XP Media Center Edition 2005: Features, printed May 9, 2007, from http://www.microsoft.com/windowsxp/mediacenter/evaluation/features.mspx, 4 pgs.
Office Action for Chinese Patent Application No. CN200880127596.4, dated May 6, 2014, 15 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.
Open DML AVI-M-JPEG File Format Subcommittee, "Open DML AVI File Format Extensions", Version 1.02, Feb. 28, 1996, 29 pgs.
PC world.com, Future Gear: PC on the HiFi, and the TV, from http://www.pcworld.com/article/id,108818-page,1/article.html, printed May 4, 2007, from IDG Networks, 2 pgs.
QTV—About BroadQ, printed May 11, 2009 from http://www.broadq.com/en/about.php, 1 pg.
Supplementary European Search Report for Application No. EP 04813918, Search Completed Dec. 19, 2012, 3 pgs.
Supplementary European Search Report for Application No. EP 10729513, completed Dec. 9, 2013, 4 pgs.
Supplementary European Search Report for EP Application 11774529, completed Jan. 31, 2014, 2 pgs.
Kaspar et al., "Using HTTP Pipelining to Improve Progressive Download over Multiple Heterogeneous Interfaces", IEEE ICC proceedings, 2010, 5 pgs.
Kim, Kyuheon , "MPEG-2 ES/PES/TS/PSI", Kyung-Hee University, Oct. 4, 2010, 66 pages.
Kozintsev et al., "Improving last-hop multicast streaming video over 802.11", Workshop on Broadband Wireless Multimedia, Oct. 2004, pp. 1-10.
Kurzke et al., "Get Your Content Onto Google TV", Google, Retrieved from: http://commondatastorage.googleapis.com/io2012/presentations/live%20to%20website/1300.pdf, 2012, 58 pgs.

(56) References Cited

OTHER PUBLICATIONS

Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Levkov, "Mobile Encoding Guidelines for Android Powered Devices", Adobe Systems Inc., Addendum B, Dec. 22, 2010, 42 pgs.
Long et al., "Silver: Simplifying Video Editing with Metadata", CHI 2003: New Horizons, Apr. 5-10, 2003, pp. 628-629.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
MSDN, "Adaptive streaming, Expression Studio 2.0", Apr. 23, 2009, 2 pgs.
Nelson, "Smooth Streaming Deployment Guide", Microsoft Expression Encoder, Aug. 2010, 66 pgs.
Nelson, Mark, "Arithmetic Coding + Statistical Modeling = Data Compression: Part 1—Arithmetic Coding", Doctor Dobb's Journal, Feb. 1991, printed from http://www.dogma.net/markn/articles/arith/part1.htm; printed Jul. 2, 2003, 12 pgs.
Nelson, Michael, "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Noboru, "Play Fast and Fine Video on Web! codec", Co.9 No. 12, Dec. 1, 2003, pp. 178-179.
Noe, A., "Matroska File Format (under construction!)", Retrieved from the Internet: URL:http://web.archive.orgweb/20070821155146/www.matroska.org/technical/specs/matroska.pdf [retrieved on Jan. 19, 2011], Jun. 24, 2007, 1-51.
Noe, Alexander, "AVI File Format", http://www.alexander-noe.com/video/documentation/avi.pdf, Dec. 14, 2006, pp. 1-26.
Noe, Alexander, "Definitions", Apr. 11, 2006, retrieved from http://www.alexander-noe.com/video/amg/definitions.html on Oct. 16, 2013, 2 pages.
Ooyala, "Wdevine Content Protection", Ooyala Support Center for Developers. Ooyala, Inc., 2013. Jun. 3, 2013. http://support.ooyala.com/developers/documentation/concepts/player_v3_widevine_integration.html.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R., "HTTP Live Streaming: draft-pantos-http-live-streaming-06", Published by the Internet Engineering Task Force (IETF), Mar. 31, 2011, 24 pages.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Phamdo, Nam, "Theory of Data Compression", printed from http://www.data-compression.com/theoroy.html on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne, H., "Real Time Streaming Protocol 2.0 (RTSP): draft-ietfmmusic-rfc2326bis-27", MMUSIC Working Group of the Internet Engineering Task Force (IETF), 296 pgs. (presented in two parts), Mar. 9, 2011, 296 pages.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Tan, Yap-Peng, et al., "Video transcoding for fast forward/reverse video playback", IEEE ICIP, 2002, pp. I-713 to I-716.
Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . on Mar. 6, 2006, 7 pgs.
Unknown, "Entropy and Source Coding (Compression)", TCOM 570, Sep. 1999, pp. 1-22.
Wang et al., "Image Quality Assessment: From Error Visibility to Structural Similarity", IEEE Transactions on Image Processing, Apr. 2004, vol. 13, No. 4, pp. 600-612.
Wu, Feng et al., "Next Generation Mobile Multimedia Communications: Media Codec and Media Transport Perspectives", In China Communications, Oct. 2006, pp. 30-44.
Zambelli, Alex, "IIS Smooth Streaming Technical Overview", Microsoft Corporation, Mar. 2009.
U.S. Appl. No. 13/905,804, "Notice of Allowance," dated Aug. 12, 2015, 8 pgs.
EP11774529 Supplementary European Search Report, completed Jan. 31, 2014, 2 pgs.
Final draft ETSI ES 202 109, V1.1.1, ETSI Standard, Terrestrial Trunked Radio (TETRA); Security; Synchronization mechanism for end-to-end encryption, Oct. 2002, 17 pgs.
International Preliminary Report for Application No. PCT/US2011/066927, Filed Dec. 22, 2011, Report dated Jul. 10, 2013, 13 pgs.
International Preliminary Report for International Application No. PCT/US2011/067243, International Filing Date Dec. 23, 2011, dated Jul. 10, 2013, 7 pgs.
International Preliminary Report on Patentability for International Application PCT/US2011/067167, dated Feb. 25, 2014, 8 pgs.
International Search Report and Written Opinion for International Application No. PCT/US07/63950, completed Feb. 19, 2008; dated Mar. 19, 2008, 9 pgs.
International Search Report and Written Opinion for International Application No. PCT/US2004/041667, Completed May 24, 2007, dated Jun. 20, 2007, 6 pgs.
International Search Report and Written Opinion for International Application No. PCT/US2011/067243, International Filing Date Dec. 23, 2011, Search Completed Apr. 24, 2012, dated May 8, 2012, 8 pgs.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
Supplementary European Search Report for International Application No. PCT/US2007063950, Report Completed Jan. 25, 2013, 8 pgs.
Written Opinion for International Application No. PCT/US2005/025845 filed Jul. 21, 2005, report completed Feb. 5, 2007 and dated May 10, 2007, 5 pgs.
Written Opinion for International Application No. PCT/US2004/041667, Filing Date Dec. 8, 2004, Report Completed May 24, 2007, dated Jun. 20, 2007, 4 pgs.
Written Opinion for International Application No. PCT/US2007/063950 filed Mar. 14, 2007, report completed Mar. 1, 2008; report dated Mar. 19, 2008, 6 pgs.
Written Opinion for International Application No. PCT/US2008/083816, Opinion completed Jan. 10, 2009, dated Jan. 22, 2009, 5 pgs.
Written Opinion for International Application No. PCT/US2009/046588, completed Jul. 14, 2009, dated Jul. 23, 2009, 5 pgs.
Written Opinion of the International Searching Authority for International Application No. PCT/US2008/87999, date completed Feb. 7, 2009, dated Mar. 19, 2009, 4 pgs.
Invitation to Pay Add'l Fees Rcvd for International Application PCT/US14/39852, dated Sep. 25, 2014, 2 pgs.
3GPP TS 26.247, V1.3.0, 3rd Generation Partnership Project; Technical Specification Group Services and System Aspects Transparent end-to-end Packet-switches Streaming Services (PSS);, Progressive Download and Dynamic Adaptive Streaming over HTTP (3GP-Dash) (Release 10), Mar. 2011, 72 pgs.
"Draft CR: Trick Mode for HTTP Streaming", 3GPP TSG-SA4 Meeting #58, Apr. 26-30, 2010, Vancouver, Canada, S4-100237, 3 pgs.
"DVD-MPEG differences", http://dvd.sourceforge.net/dvdinfo/dvdmpeg.html, printed on Jul. 2, 2009, 1 page.

(56) References Cited

OTHER PUBLICATIONS

"Information Technology—Coding of audio-visual objects—Part 14: MP4 file format", International Standard, ISO/IEC 14496-14, First Edition, Nov. 15, 2003, 18 pgs.
"Information technology—Generic coding of moving pictures and associated audio information: Systems", International Standard ISO/IEC 13818-1, Second Edition, Dec. 1, 2000, 174 pgs.
"Information-Technology—Generic coding of moving pictures and associated audio: Systems, Recommendation H.222.0", International Standard, ISO/IEC 13818-1, Draft 1209, Apr. 25, 1995, 151 pgs.
"Information-Technology—Generic coding of moving pictures and associated audio: Systems, Recommendation H.222.0", International Standard, ISO/IEC 13818-1, Draft 1540, Nov. 13, 1994, 161 pgs.
"International Search Report and Written Opinion for International Application PCT/US2010/020372", Search Report dated Mar. 1, 2010, 7 pgs.
"Matroska", Wikipedia, Jul. 10, 2017, retrieved from https://en.wikipedia.org/wiki/Matroska on Jul. 20, 2017, 3 pgs.
"MovieLabs Specification for Next Generation Video—Version 1.0", Motion Picture Laboratories, Inc., 2013, Retrieved from: http://movielabs.com/ngvideo/MovieLabs%20Specification%20for%20Next%20Generation%20Video%20v1.0.pdf, 5 pgs.
"MPEG-2", Wikipedia, Jun. 13, 2017, retrieved from https://en.wikipedia.org/wiki/MPEG-2 on Jul. 20, 2017, 13 pgs.
"MPEG-4 File Format, Version 2", Sustainability of Digital Formats: Planning for Library of Congress Collections, Retrieved from: https://www.loc.gov/preservation/digital/formats/fdd/fdd000155.shtml, Last updated Feb. 21, 2017, 8 pgs.
"MPEG-4 Part 14", Wikipedia, Jul. 10, 2017, retrieved from https://en.wikipedia.org/wiki/MPEG-4_Part_14 on Jul. 20, 2017, 5 pgs.
"Series H: Audiovisual and Multimedia Systems Infrastructure of audiovisual services—Coding of moving video; High efficiency video coding", International Telecommunication Union, ITU-T H.265, Apr. 2015, 634 pgs.
"Specifications Matroska", Dec. 17, 2010, [retrieved on Mar. 2, 2018], 12 pgs.
Adams et al, "Will http adaptive streaming become the dominant mode of video delivery in cable networks?", https://www.nctatechnicalpapers.com/Paper/2011/2011-will-http-adaptive-streaming-become-the-dominant-mode-of-video-delivery-in-cable-networks-, 10 pgs.
Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.
Adzic et al, "Optimized Adaptive HTTP Streaming for Mobile Devices", International Society for Optics and Photonics, Applications of Digital Image Processing XXXIV, vol. 8135, Sep. 2011, 10 pgs.
Bloom et al., "Protection for DVD Video", Proceedings of the IEEE, vol. 87, No. 7, Jul. 1999, pp. 1267-1276.
Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013 310 pgs.
Concolato et al., "Live HTTP Streaming of Video and Subtitles within a Browser", MMSys 2013, Feb. 26-Mar. 1, 2013, Oslo, Norway, 5 pgs.
Eskicioglu et al., "An Integrated Approach to Encrypting Scalable Video", Proceedings IEEE International Conference on Multimedia and Expo, Aug. 26-29, 2002, Lausanne, Switzerland, 4 pgs.
Fecheyr-Lippens, "A Review of HTTP Live Streaming", Internet Citation, Jan. 25, 2010, 38 pgs.

Hartung et al., "DRM Protected Dynamic Adaptive HTTP Streaming", MMSys 2011 Proceedings of the Second Annual ACM Conference on Multimedia Systems, San Jose, California, Feb. 23-25, 2011, pp. 277-282.
Hurtado Guzman, Juan Esteban, "Development and Implementation of an Adaptive HTTP Streaming Framework for H264/MVC Coded Media", Politecnico di Torino, Nov. 2010, 108 pgs.
Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, 10 pgs.
Li et al, "Content-Aware Playout and Packet Scheduling for Video Streaming Over Wireless Links", IEEE Transactions on Multimedia, vol. 10, No. 5, Aug. 2008, pp. 885-895.
Lian et al., "Efficient video encryption scheme based on advanced video coding", Multimed. Tools Appl. vol. 38, 2008, pp. 75-89.
Liu et al., "A Formal Framework for Component Deployment", OOPSLA 2006, Proceedings of the 21st Annual ACM SIGPLAN Conference on Object-Oriented Programming Systems, Language, and Applications, Portland, Oregon, Oct. 22-26, 2006, 19 pgs.
Matroska, "Diagram", Matroska, Technical/Info, Diagram, 2016, retrieved from https://www.matroska.org/technical/diagram/index.html on Jul. 20, 2017, 9 pgs.
Matroska, "Specifications", Matroska, Technical/Info, Specifications, Jun. 25, 2017, retrieved from https://www.matroska.org/technical/specs/index.html on Jul. 20, 2017, 20 pgs.
Miras, "On Quality Aware Adaptation of Internet Video", University of London, PhD dissertation, 2004, 181 pgs.
Moscoso, Pedro Gomes, "Interactive Internet TV Architecture Based on Scalable Video Coding", Instituto Superior Techico, Universidad Technica de Lisboa, May 2011, 103 pgs.
Oyman et al, "Quality of Experience for HTTP Adaptive Streaming Services", IEEE Communications Magazine, Apr. 2012, vol. 50, No. 4, DOI: 10.1109/MCOM.2012.6178830, 8 pgs.
Ozer, Jan, "Adaptive Streaming in the Field", Streaming Media, Dec. 2010-Jan. 2011, 9 pgs.
Padiadpu, Rashmi, "Towards Mobile Learning: A SCORM Player for the Google Android Platform", Master Thesis, Hamburg University of Applied Sciences, 2008, 66 pgs.
Peek, David, "Consumer Distributed File Systems", Dissertation, Doctor of Philosophy, Computer Science and Engineering, The University of Michigan, 2009, 118 pgs.
Rosenberg et al., "Indicating User Agent Capabilities in the Session Initiation Protocol (SIP)", Network Working Group, RFC 3840, Aug. 2004, 36 pgs.
Silvio, "adaptive HTTP streaming for open codecs", Oct. 9, 2010, retrieved on: Mar. 2, 2018, 15 pgs.
Tripathi et al, "Improving Multimedia Streaming with Content-Aware Video Scaling", Retrieved from: http://digitalcommons.wpi.edu/computerscience-pubs/96, 2001, 17 pgs.
Unknown, "MPEG-4 Video Encoder: Based on International Standard ISO/IEC 14496-2", Patni Computer Systems, Ltd., publication date unknown, 15 pgs.
Venkatramani et al., "Securing Media for Adaptive Streaming", Multimedia 2003 Proceedings of the Eleventh ACM International Conference on Multimedia, Nov. 2-8, 2003, Berkeley, California, 4 pgs.
"Microsoft Announces Breakthrough Technology Enabling Simple Access to Broad Set of Digital Content, Including Music, Games, Video, Ring Tones and Pictures", Microsoft, Feb. 12, 2017, Retrieved from https://news.microsoft.com/2007/02/12/microsoft-announces-breakthrough-technology-enabling-simple-access-to-broad-set-of-digital-content-including-music-games-video-ring-tones-and-pictures/, 5 pgs.
Bocharov et al., "Portable encoding of audio-video objects: The Protected Interoperable File Format (PIFF)", Microsoft Corporation, Sep. 8, 2009, Revised: Mar. 9, 2010, 32 pgs.

* cited by examiner

ELEMENTARY BITSTREAM CRYPTOGRAPHIC MATERIAL TRANSPORT SYSTEMS AND METHODS

CROSS-REFERENCE TO RELATED APPLICATIONS

The current application is a continuation application of U.S. application Ser. No. 14/839,783 filed Aug. 28, 2015 entitled "Elementary Bitstream Cryptographic Material Transport Systems and Methods" which application is a continuation of U.S. application Ser. No. 14/306,146 filed Jun. 16, 2014, and issued on Sep. 1, 2015 as U.S. Pat. No. 9,124,773, entitled "Elementary Bitstream Cryptographic Material Transport Systems and Methods" which application is a continuation application of U.S. application Ser. No. 12/946,631 filed Nov. 15, 2010, and issued on Jul. 15, 2014 as U.S. Pat. No. 8,781,122, entitled "Elementary Bitstream Cryptographic Material Transport Systems and Methods" which claims priority to U.S. Provisional Patent Application No. 61/266,982, filed Dec. 4, 2009, the disclosures of which are incorporated herein by reference.

BACKGROUND

The present invention generally relates to digital multimedia distribution systems and more specifically to digital transmission of encrypted multimedia content over an unsecured connection.

Providers of multimedia content can digitize content for distribution via digital communication networks. An important issue faced by a content distribution system is enabling only those customers that have purchased the content to play the content and compartmentalize access to all the stakeholders in the content distribution chain. One approach is to encrypt portions of the content and to issue encryption keys to authorized users that enable encrypted portions of the content to be unencrypted. Layers of keys and protection policies can be used so a single encryption key alone is insufficient for the user to access the content. In a number of systems, users purchase players that possess specified decryption capabilities. Content providers can distribute content to user's owning such a player in an encryption format supported by the player. Complying with a specified protection policy typically involves using an encryption key specified by the manufacturer of the players. In many instances the manufacturer of the players will not reveal the encryption keys used in the specified encryption scheme and likewise the content provider does not want to share the content keys to the manufacturer of the players.

Communications between components or processes of players or playback systems are typically trustworthy and secured. However, when communication or the transporting of information becomes unsecured or untrustworthy, such gaps need to be accounted for and filled. This has become more evident with advent and popularity of open multimedia frameworks. Bi-directional communication requirements and/or run time challenges and authentication requests to fill such gaps have proved to be less than adequate.

There are many ways of securing communication, including ciphering and encryption.

Ciphering is a procedure used to secure data that typically involves using a series of steps to scramble and render the data readable only to the intended audience. The procedure itself does not require an outside source, such as a key, in order to encipher or decipher the data. Rather, data can be properly deciphered by the intended audience so long as deciphering exactly follows the enciphering steps to unravel the data. Encryption is a procedure used to secure data. That typically involves the use of an external input for at least one step in the procedure, such as a key, in order to secure and/or access the data. The external data is used to intentionally manipulate at least one step in the encryption or decryption process, changing the way the data processing for encryption occurs. Generally, without the external data or a corresponding decryption key in an encryption process, a step in a corresponding decryption process cannot properly be executed and the data cannot be properly decrypted.

In the context of digital media, encoding is a procedure by which digital media is represented in a digital format. The format is typically selected to obtain specific benefits during the transportation, playback and storage of the digital media format used. For example, representing the media using fewer bits may be beneficial to transfer data in order to minimize bandwidth usage or storage space. In another example, a media player may only decode or read media in a certain format and therefore the digital media may first be in that format in order to be decoded by that media player.

Decoding is a procedure by which digital media in a format is translated into a format readable by a media player for rendering on a display device. Often, decoding may also reverse processes associated with encoding such as compression. In instances where encryption and/or enciphering have been applied to encoded media, the enciphering process or encryption process typically must be reversed before the encoded media can be decoded.

SUMMARY OF THE INVENTION

Systems and methods are described for taking cryptographic material from a container file and inserting the cryptographic material in an elementary bitstream, where the cryptographic information can then be used to decrypt the elementary bitstream for playback A number of embodiments include obtaining the cryptographic information, extracting the at least partially encrypted video data from the container file to create an elementary bitstream, enciphering the cryptographic information, inserting the cryptographic information in the elementary bitstream, providing the elementary bitstream to a video decoder, extracting the cryptographic information from the elementary bitstream at the video decoder, deciphering the cryptographic information, decrypting the elementary bitstream with the cryptographic information and decoding the elementary bitstream for rendering on a display device using the video decoder.

In a further embodiment, the cryptographic information is obtained from the container file.

In another embodiment, the cryptographic information includes key information and information concerning at least a portion of the at least partially encrypted video data that is encrypted using the key information.

In an additional embodiment, information concerning at least a portion of the at least partially encrypted video data is a reference to a block of encrypted data within an encoded frame of video that is encrypted using the key information.

In a still further embodiment, the cryptographic information inserted in the elementary bitstream is delimited by an identifier and the cryptographic information is inserted before the at least partially encrypted video data encrypted using the key information.

In a still other embodiment, the cryptographic information is extracted using the identifier.

In a still additional embodiment, the decrypting process is performed by using the key information to identify the encrypted portion of video data and decrypting the encrypted video data using the key information.

In a yet further embodiment, cryptographic information inserted in different locations within the elementary bitstream includes different key information.

In a yet other embodiment, the at least partially encrypted video data includes frames of encoded video. In addition, the at least partially encrypted video data includes at least a portion of a plurality of the encoded frames that is encrypted.

In a yet further additional embodiment, the enciphering process and the deciphering process are synchronized such that a delay in excess of a predetermined time between enciphering and deciphering results in the cryptographic information being unrecoverable.

In a still further embodiment again, the enciphering process enciphers data by using a sequence of scrambling processes to scramble data.

In a still other embodiment again, the deciphering process deciphers data by performing the inverse sequence of scrambling processes to the sequence used to scramble the data.

Many embodiments include a demultiplexer configured to extract the at least partially encrypted video data from the container file to create an elementary bitstream, a video decoder configured to decrypt the elementary bitstream using the cryptographic information and decode the elementary bitstream for rendering on a display device. Additionally, the demultiplexer is configured to encipher the cryptographic information and insert the enciphered cryptographic information in the elementary bitstream and the decoder is configured to extract enciphered cryptographic information from an elementary bitstream and to decipher the cryptographic information.

In a further embodiment, the cryptographic information is obtained from the container file.

In another embodiment, the cryptographic information includes key information and information concerning at least a portion of the at least partially encrypted video data that is encrypted using the key information.

In an additional embodiment, the information concerning at least a portion of the at least partially encrypted video data is a reference to a block of encrypted data within an encoded frame of video that is encrypted using the key information.

In a further embodiment again, the demultiplexer is configured to insert the cryptographic information delimited by an identifier in the elementary bitstream and insert the cryptographic information before the at least partially encrypted video data encrypted using the key information.

In another embodiment again, the decoder is configured to extract the cryptographic information using the identifier.

In an additional embodiment again, the decoder is configured to decrypt the portion of the video data encrypted using the key information by identifying the encrypted portion of video data and decrypting the encrypted video data using the key information.

In a still further embodiment again, cryptographic information inserted in different locations within the elementary bitstream includes different key information.

In still another embodiment again, the at least partially encrypted video data includes frames of encoded video. Additionally, at least a portion of a plurality of the encoded frames is encrypted.

In a still additional embodiment, both the demultiplexer and the decoder are configured to be synchronized such that a delay in excess of a predetermined time between enciphering and deciphering results in the cryptographic information being unrecoverable.

In a yet further embodiment, the demultiplexer is configured to encipher data by using a sequence of scrambling processes to scramble data.

In a yet other embodiment, the decoder is configured to decipher data by performing the inverse sequence of scrambling processes to the sequence used to scramble the data.

Numerous embodiments include obtaining the cryptographic information. In addition, the cryptographic information is obtained from the container file. Also, the at least partially encrypted video data includes frames of encoded video and at least a portion of a plurality of the encoded frames is encrypted. Additionally, the cryptographic information includes key information and information concerning at least a portion of the least partially encrypted video data that is encrypted using the key information. Furthermore, the information concerning at least a portion of the at least partially encrypted video data is a reference to a block of encrypted data within an encoded frame of video that is encrypted using the key information and the cryptographic information inserted in different locations within the elementary bitstream includes different key information.

Several embodiments include extracting the at least partially encrypted video data from the container file to create an elementary bitstream. In addition, the cryptographic information inserted in the elementary bitstream is delimited by an identifier and the cryptographic information is inserted before the at least partially encrypted video data encrypted using the key information.

Many embodiments include enciphering the cryptographic information and inserting the cryptographic information in the elementary bitstream. In addition, the cryptographic information is extracted using the identifier.

A number of embodiments include providing the elementary bitstream to a video decoder, extracting the cryptographic information from the elementary bitstream at the video decoder and deciphering the cryptographic information. In addition, the enciphering process and the deciphering process are synchronized such that a delay in excess of a predetermined time between enciphering and deciphering results in the cryptographic information being unrecoverable. Also, the enciphering process enciphers data by using a sequence of scrambling processes to scramble data. Furthermore, the deciphering process deciphers data by performing the inverse sequence of scrambling processes in the sequence used to unscramble data.

Several embodiments include decrypting the elementary bitstream with the cryptographic information. In addition, the decrypting process is performed by using the key information to identify the encrypted portion of video data and decrypting the encrypted video data using the key information.

Many embodiments include decoding the elementary bitstream for rendering on a display device using the video decoder.

DETAILED DESCRIPTION

Systems and methods for providing multimedia content from one process or component to another process or component over an unsecured connection are provided. In several embodiments, the transmission occurs between a demultiplexer and a decoder over an unsecured connection where traditionally such connections are secured. In many embodiments, the transmission occurs on a bi-directional communication path. Embodiments of the present invention do not secure the transmission but rather secure the data being transmitted via the unsecured connection. The transmitted data in a number of embodiments includes an encrypted multimedia bitstream and associated cryptographic material in the bitstream for transmission to a decoder for decryption. In various embodiments, a bi-directional communication path between a demultiplexer and the decoder is not used. Additionally, by allowing the decryption to occur on the decoder the bitstream is protected even if the connection is compromised and an unauthorized component or process intercepts the bitstream.

In various embodiments, frame keys are used to decrypt the bitstream. For example, in the manner described in U.S. Pat. No. 7,295,673 to Grab et al. the disclosure of which is incorporated by reference herein in its entirety. In several embodiments, the frame keys are protected by a cryptographic wrap algorithm that uses a separate series of newly generated keys. The wrapped frame keys are inserted into the encrypted bit stream for deciphering and decoding by the decoder. The cryptographic information in various embodiments includes information to decrypt a video frame or a portion of the video frame. In various embodiments, a time indicator in the form of a frame sequence is also utilized to ensure connection between the demultiplexer and decoder is not being intercepted or spied upon.

The cryptographic information inserted into the elementary bitstream can take any of a variety of forms. In many embodiments, the cryptographic information includes a frame key and/or a reference to a block of encrypted video data. In several embodiments, the cryptographic information contains an index to a frame key or a separate reference to both a frame key and an encrypted block. A number of embodiments provide for first inserting a table of possible keys and still further embodiments provide for sending multiple keys where different keys are used to encrypt different portions of the video.

Figure 1:
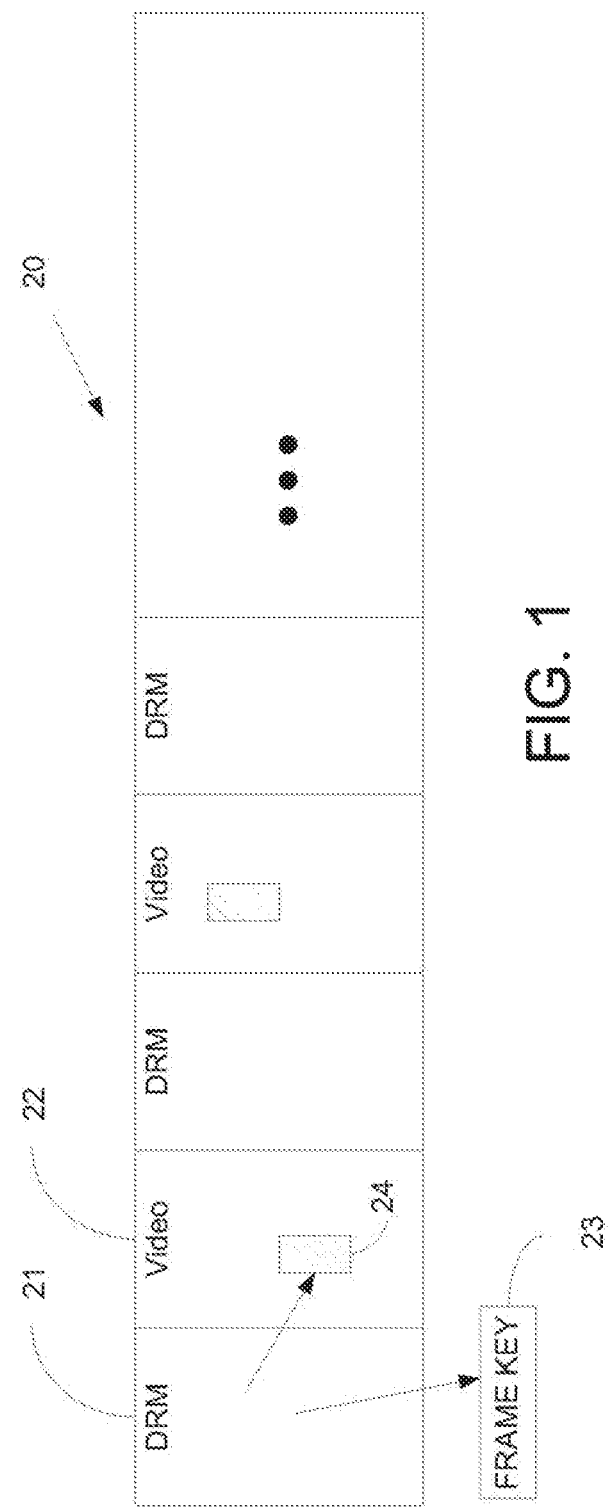
FIG. 1 illustrates a graphical representation of a multimedia container file in accordance with various embodiments of the present invention.

Turning now to the drawings, FIG. 1 represents a multimedia container file 20 including encrypted content, e.g., video. The multimedia container file includes a digital rights management portion 21 preceding associated video portions or chunks 22. The digital rights management portion includes at least one frame key 23 or an index to a frame key in a separately provided table of frame keys, which in many embodiments is encrypted in a way that only enables playback by a particular device and/or user. The digital rights management portion also points to or identifies a specified portion of or an entire video frame within the video chunk 24 that is encrypted. Without first decrypting this encrypted portion of the video chunk, the video content cannot be decoded or displayed. The multimedia container file is supplied to a demultiplexer.

The demultiplexer parses the multimedia container file and transmits portions or chunks of data, e.g., video or audio, to a decoder. However, prior to transmitting the video data, the demultiplexer incorporates or attaches cryptographic material to the video data.

Figure 2:
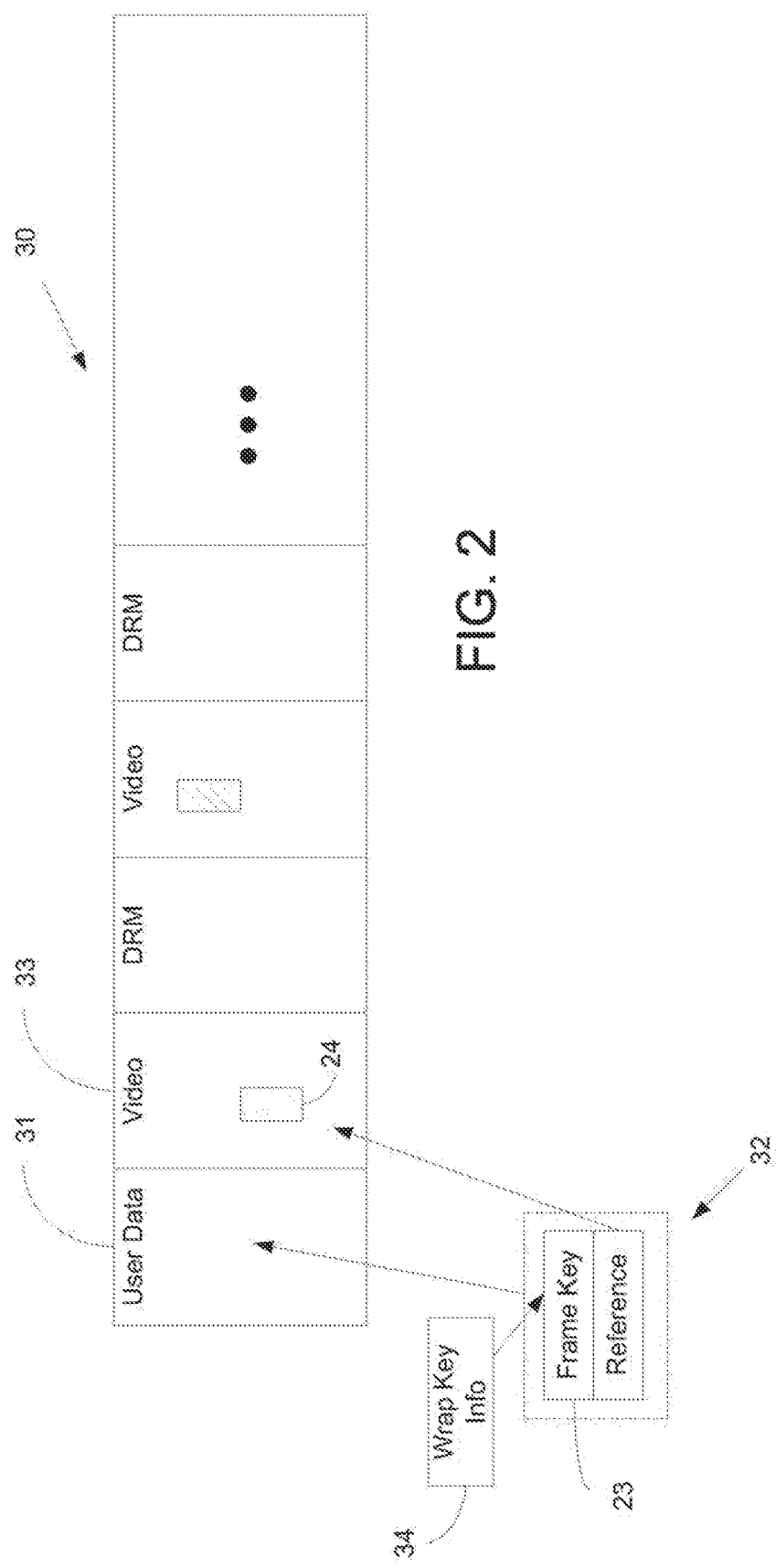
FIG. 2 illustrates a graphical representation of a bitstream with cryptographic material in accordance with various embodiments of the present invention.

FIG. 2 graphically illustrates the generated multimedia bitstream sent to the decoder. The bitstream 30 includes a header or user data 31 that includes cryptographic material 32. In accordance with many embodiments of the invention, the material includes the frame key 23 from the multimedia container file, which is encrypted using a wrap key, and wrap key information 34 to provide synchronization of the demultiplexer to the decoder in order to decipher the cryptographic material. As is discussed below, the wrap key information can take any of a variety of different forms depending upon the specific application including but not limited to information enabling synchronization of wrap key factories and/or the direct transfer of the wrap keys themselves. The associated video data 33 follows.

Figure 3:
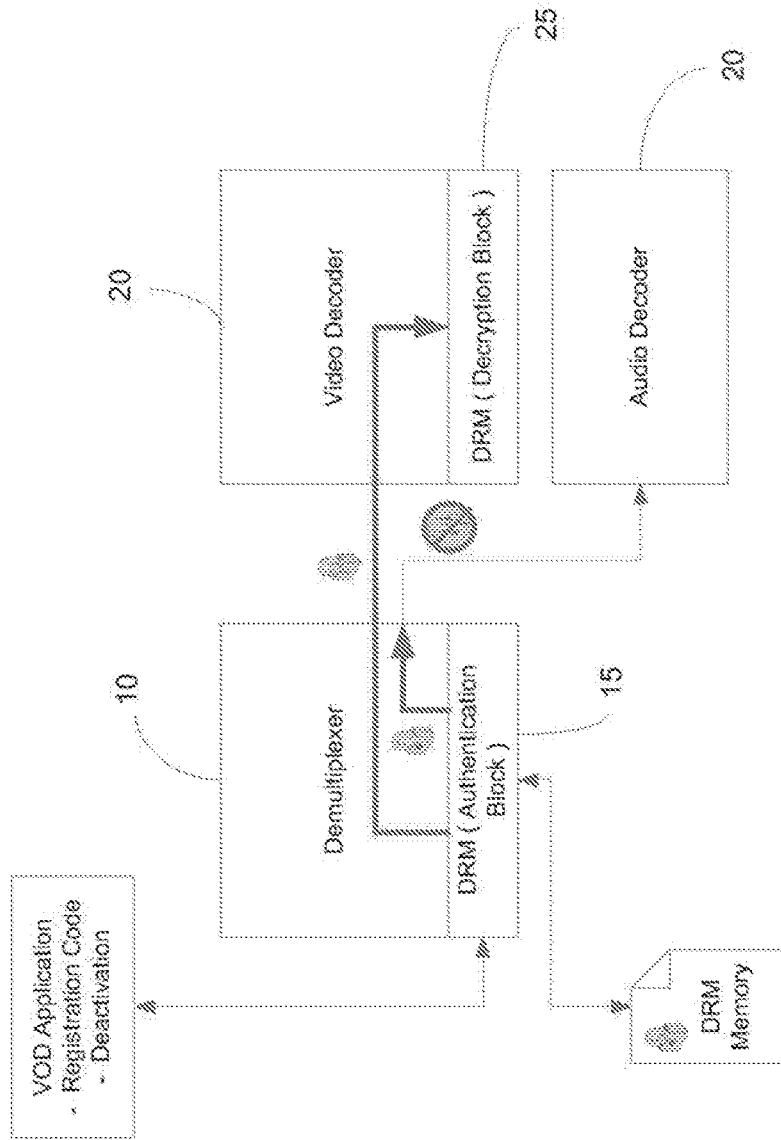
FIG. 3 is a block diagram of a multimedia cryptographic bitstream transport system in accordance with various embodiments of the present invention.

Referring now to FIG. 3, a demultiplexer 10 that receives a multimedia container file that includes video and audio data, portions of which are encrypted, is shown. In one embodiment, the multimedia file conforms to a specific format such as audio video interleave (AVI) or Matroska (MKV). The multimedia file is provided via a disc, flash memory device or another tangible storage medium or streamed or otherwise transmitted to the demultiplexer. The demultiplexer separates portions of the received multimedia data including but not limited to video, audio and encryption data that is supplied to an upstream digital rights management component 15. In various embodiments, the connection between the demultiplexer 10 and the digital rights management component 15 can be secure although need not be depending upon the requirements of the application. The digital rights management component 15 generates cryptographic material and the multimedia bitstream transport that is supplied to a decoder 20. In particular, the demultiplexer 10 transmits video data with cryptographic material to the decoder 20.

The connection between the demultiplexer and the decoder is typically secured. However, in the illustrated embodiment, the connection is not secured. Typically, the multimedia file is authorized and decrypted in a demultiplexer and then transmitted downstream unencrypted to the decoder via an inter-communication data channel. This however can present a security problem due to the high value of the unencrypted but still encoded bitstream that can be captured during transmission. This bitstream is considered high-value since the encoded data can be easily multiplexed back into a container for unprotected and unauthorized views and/or distribution with no loss in the quality of the data. In the illustrated embodiment, the video provided to the decoder 20 by the demultiplexer 10 is at least partially encrypted and the decoder 20 communicates with a downstream digital rights management component 25 that deciphers the cryptographic material. Utilizing the deciphered cryptographic material, the digital rights management component is able to access the encryption data and thereby decrypt and decode the video data for playback.

Figure 4:
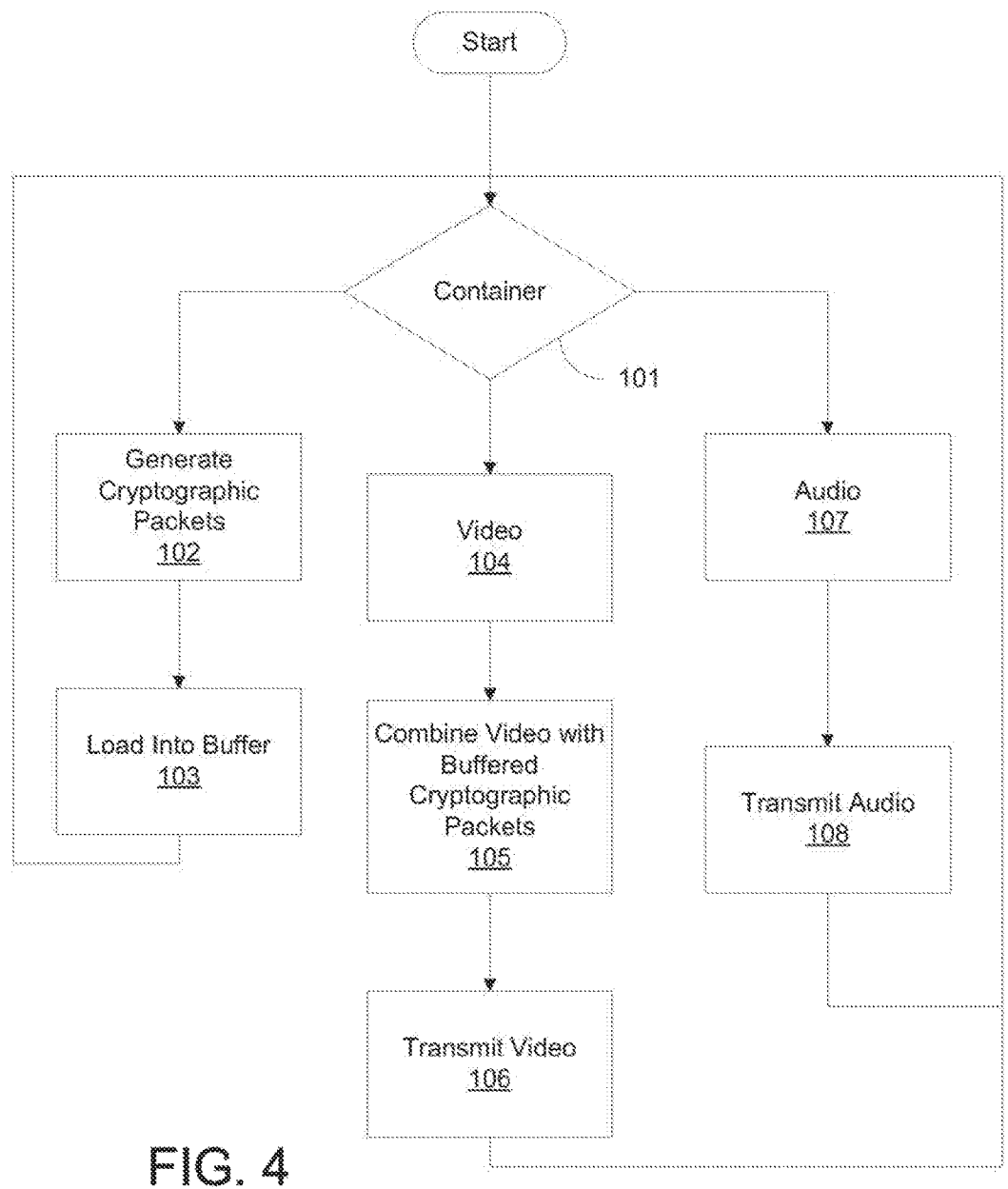
FIG. 4 is a flow diagram of a demultiplex and authentication process in accordance with various embodiments of the present invention.

The general processes of the demultiplexer and the decoder are now described. In FIG. 4, the demultiplexer and authentication process is illustrated in which a multimedia container file is received and portions of which are identified or separated (101). If encryption data is identified, cryptographic packets or material are generated (102) and stored in a temporary buffer (103). However, if video data is identified (104), the cryptographic material stored in the temporary buffer is combined with the video data (105) and then transmitted to a video decoder (106). If audio data is identified (107), the audio data is transmitted (108) to the audio decoder. It should be appreciated that audio or other types of data may also include encryption data and thus associated cryptographic material is generated and combined with the associated data and transmitted to the respective decoder. Also, other types of data may be included in the container file without encryption data and thus is transmitted directly to the associated decoder.

Figure 5:
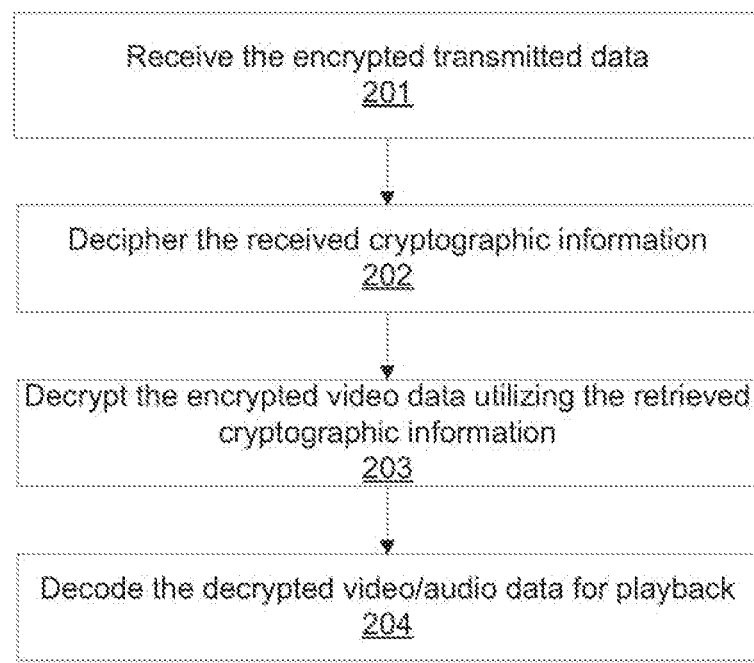
FIG. 5 is a flow diagram of a decoder and decipher process in accordance with various embodiments of the present invention.

In FIG. 5, a decoder and decipher process is illustrated in which the decoder receives video and/or audio data sent from the demultiplexer (201). The decoder deciphers the cryptographic material supplied with the associated data (202). Utilizing the deciphered material, the encrypted data is decrypted (203) and decoded (204) by the decoder for playback.

To further elaborate on the demultiplexer and decoder processes and the bitstream transport system, a more detailed representation of the demultiplexer's and decoder's associated digital rights manager along with the associated processes are illustrated in the remaining figures.

Figure 6:
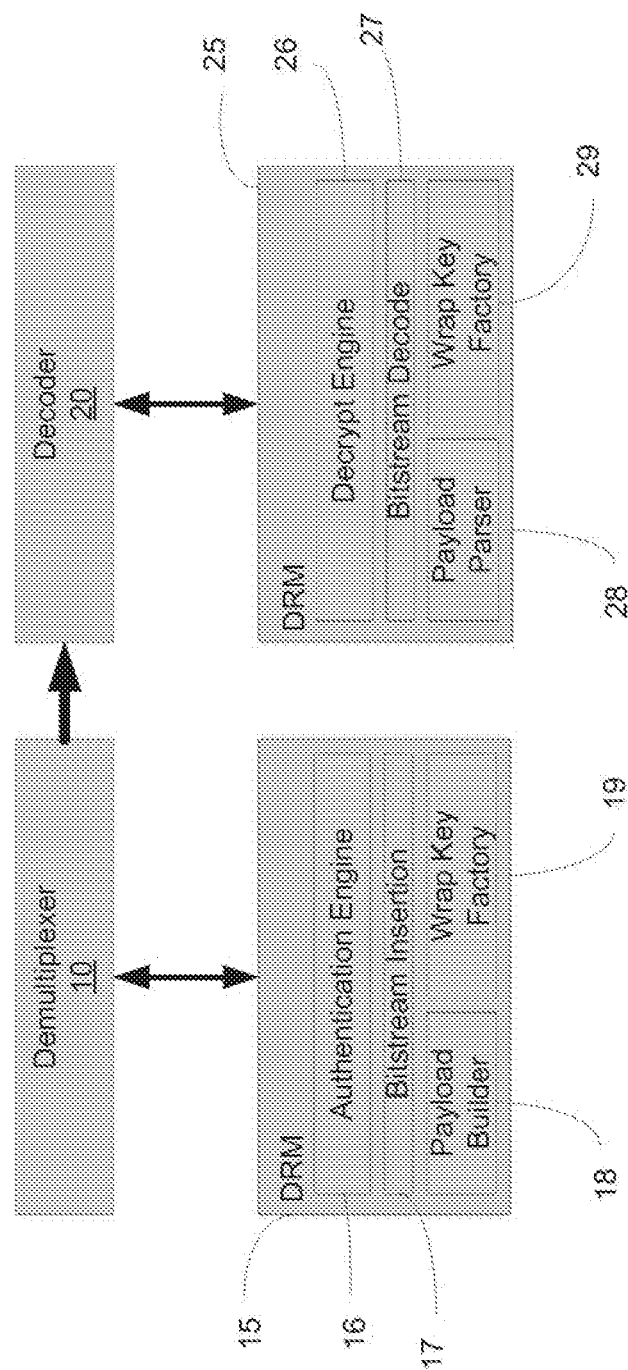
FIG. 6 is a block diagram of a multimedia cryptographic bitstream transport system in accordance with various embodiments of the present invention.

Referring to FIG. 6, the upstream digital rights manager 15 of the demultiplexer 10 includes an authentication engine 16, a bit stream inserter 17, a payload builder 18 and a wrap key factory 19. The downstream digital rights manager 25 of the decoder includes a decrypt engine 26, a bit stream decoder 27, a payload parser 28 and a wrap key factory 29. The authentication engine prepares cryptographic material utilizing the encryption data from the container file and the video data in conjunction with the payload builder 18 and the wrap key factory 19.

The payload builder 18 provides discrete units of cryptographic material in the bitstream delimited by an identifier. On the decoder, the payload parser 28 utilizes the identifiers to extract the discrete units, which are then processed by the decrypt engine 26. In many embodiments, the cryptographic material in one embodiment includes a bitstream frame header along with a cryptographic payload. The cryptographic payload, however, is not dependent on the format of the header of the elementary bitstream, e.g., MPEG-4 or H.264.

In one embodiment, the payload builder 18 inserts a reserved start code identifier along with a cryptographic payload at the front of each video chunk that is demultiplexed. By utilizing a reserved start code, the decrypt engine 26 can pass the entire video data including the inserted cryptographic material to the decoder 20 that simply discards or ignores the cryptographic material. For example, a MPEG-4 compliant decoder discards frames that contain a reserved start code identifier that is included in the bitstream. Accordingly, removal of any of the cryptographic material from the bitstream is not needed to decode the associated data.

The cryptographic payload in one embodiment includes three different packet types: a wrap key, a synchronization payload and a frame payload. The frame payload indicates that the current frame is encrypted and includes key information and a reference to at least a portion of the encoded frame that is encrypted. The frame payload can be used to decrypt the video frame. The synchronization payload is the first packet sent to synchronize the authentication engine of the demultiplexer to the decrypt engine of the decoder. This synchronization ensures that data transmitted from the demultiplexer to the decoder is not being intercepted. The wrap key includes information to unwrap or decipher the transmitted data from the demultiplexer.

The bit stream inserter 17 packages the cryptographic material for transport with the video data. Conversely, the bit stream decoder 27 of the decoder unpacks the cryptographic material from the bitstream. In one embodiment, frame keys are transported in the bitstream and are sent when a key index change is detected by the authentication engine of the demultiplexer. In many embodiments, the decrypt engine of the decoder stores only one frame key and thus frame encryption information sent by the demultiplexer applies to the current frame. If the decrypt engine receives a new frame key from the demultiplexer, the decrypt engine stores the new frame key and uses it to decrypt the next frame. In a number of embodiments, a key table is transmitted and stored in the decrypt engine for reference by subsequent encryption information. In several embodiments, the decoder does not enforce key rotation. In many embodiments, however, the decoder expects a new frame key after a predetermined number of frames in the sequence of frames. In this way, the decrypt engine can identify when supplied frame information is unreliable and terminate the decoding of the multimedia bitstream.

The wrap key factory 19 encrypts or wraps the cryptographic material for transport on the bitstream to the decoder. In one embodiment, the wrap key factory uses a key wrap process based on the Advanced Encryption Standard (AES) and uses the ECB Cipher Mode to provide cryptographic security for wrapping small blocks of data using chaining and cipher feedback loop. The key wrap process is stateless. A corresponding wrap key factory is included with the decoder to unwrap the cryptographic material. Synchronization with the corresponding wrap key factory 29 is used to allow unwrapping of the material without communication back to the demultiplexer (i.e., bi-directional communication) and to prevent unauthorized decoding of the content by, for example, a rogue process intercepting or copying the transmitted content.

Wrap Key Factory

In one embodiment, each of the authentication and decryption blocks (digital rights managers 15, 25) construct a series of predictable transform number sequences using a common heuristic. Subsequently, those numbers are combined with a random value for additional entropy used to contribute toward key material for wrapping keys.

Figure 7:
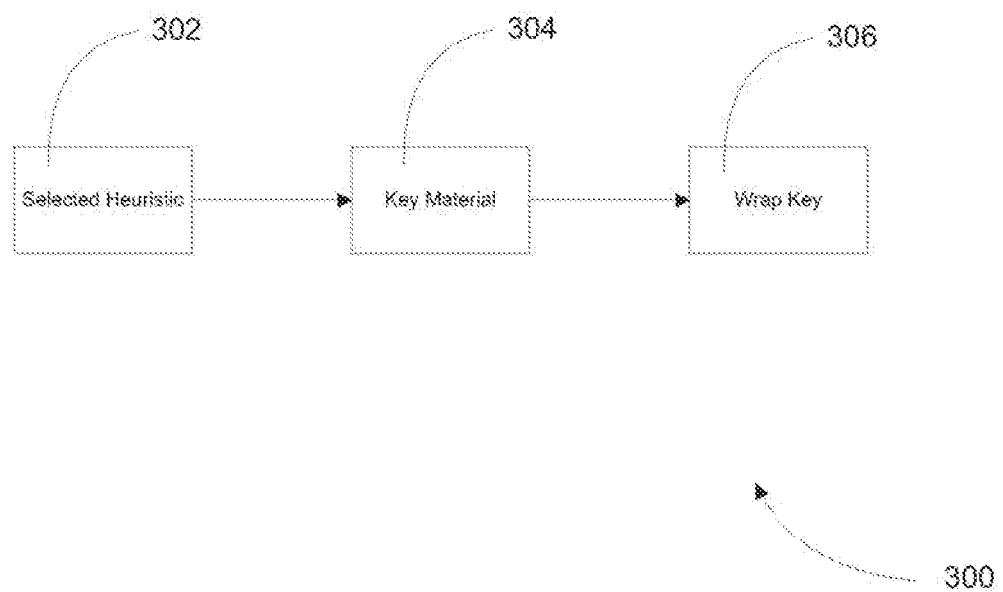
FIG. 7 is a flow diagram of a wrap key generation process in accordance with various embodiments of the present invention.

A flow diagram of a wrap key generation process 300 in accordance with an embodiment of the invention is illustrated in FIG. 7. A selected heuristic (302) is combined with key material (304) to create a wrap key (306).

In accordance with various embodiments, one such heuristic (302) may combine the use of a predictable number sequence generator such that identical transform sequences can be generated by different heuristics even though no information is exchanged. If both authentication and decrypt blocks are created such that the output of the common heuristic are identical, the key material (304) generated from such heuristic will be identical. This may apply in situations where a wrapped key (306) and a selected heuristic (302) are provided. Any process for generating identical encryption keys without exchange of key material can be used as an appropriate heuristic to generate wrapping keys (306) in accordance with embodiments of the invention. Although, some information exchange to enable synchronization between the two wrap key factories can be utilized in accordance with embodiments of the invention.

The two wrap key factories use the same transform sequence. To synchronize the wrap key factories, the sender's wrap key factory selects one heuristic (302) from a predetermined set of heuristics to generate the key material for the next wrap key. The decoder factory will receive a known payload that has been encrypted with the sender's wrap key (306) generated using selected heuristic (302) from the known set of heuristics. The receiver then attempts to decrypt and verify the contents of the payload using each of the predetermined heuristics. If the material matches what is expected, then the receiver has identified the correct heuristic (302). If all the heuristics are exhausted, then this is considered a fatal error and decryption cannot continue.

Initially, the synchronization payload is used to assist the decrypt block in identifying the appropriate transform sequence quickly. Once the decrypt block locates the proper heuristic (302), the decrypt block wrap key factory utilizes that transform sequence for all subsequent transforms. In several embodiments, once a heuristic has exhausted all values, that heuristic will deterministically choose the next heuristic to use.

Run time synchronization is maintained through monotonically incrementing a wrap number that is incremented for each wrap key generated. If an error occurs using a particular wrap key (i.e. unallowable data present in the cryptographic payload), the wrap key factory will regenerate a new wrap key and subsequently increment the wrap number. In one embodiment, the frame payload received by the decrypt block contains a wrap number element. On the decrypt block, this wrap number element is compared with the internal wrap number of the decrypt block to determine if the current wrap key needs to be skipped. In one embodiment, the wrap key includes data fed into a cryptographic digest. The resulting bytes from the digest are then used to create an AES key. A new wrap key will be generated for each payload that is wrapped.

Bitstream Data Insertion

Figure 8:
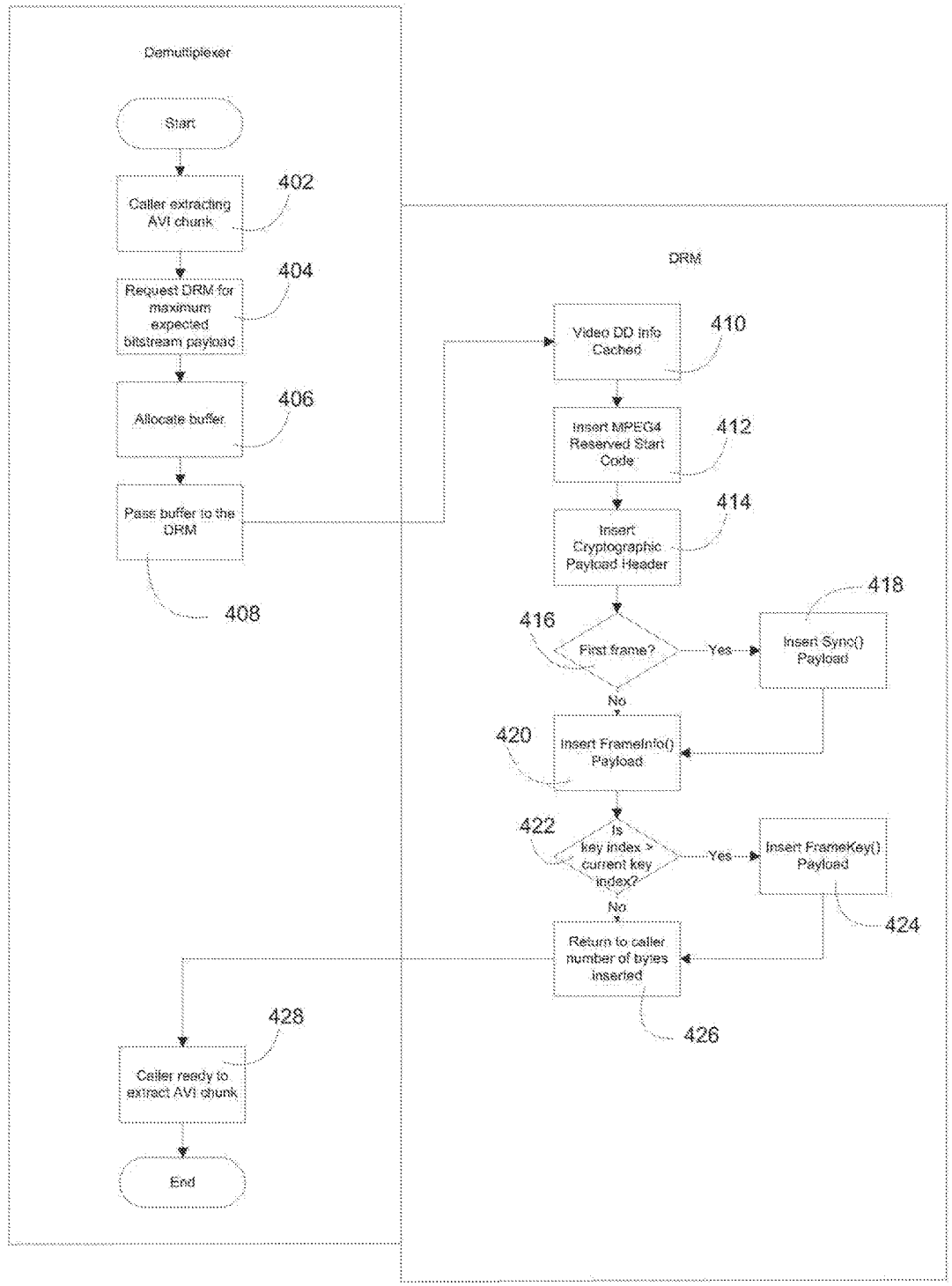
FIG. 8 is a flow diagram of a bitstream insertion process in accordance with various embodiments of the present invention.

A flow diagram of a bitstream insertion process 400 utilized with respect to video data extracted from an AVI container in accordance with an embodiment of the invention is illustrated in FIG. 8. In the demultiplexer, a caller begins extraction (402) of a relevant AVI chunk and requests (404) the DRM for the maximum expected bitstream payload. The demultiplexer then uses the information from the DRM to allocate (406) space in a buffer and passes (408) the buffer to the DRM. Next on the DRM, the video DD info is cached (410). The video DD info may be a data segment in a file container describing the data contained in a single block of container data, such as all of the video frame data in a single AVI chunk. Encrypted frames may have a DD info which contains information relating to the security features of the frame. The MPEG4 reserved start code is inserted (412) into the buffer and then the cryptographic payload header is inserted (414) into the buffer. A decision (416) is then made as to whether the chunk is the first frame. If the chunk is the first frame, then a Sync( ) payload is inserted (418) and a FrameInfo( ) payload is inserted (420). The Sync( ) payload may include the wrap key synchronization payload to synchronize the wrap keys. The FrameInfo( ) payload may include the cryptographic offset and length of information relating to data security in the video data, possibly as part of the DD Info data. If the chunk is not the first frame, then only the FrameInfo( ) payload is inserted (420). Then, a decision (422) is made as to whether the key index is greater than the current key index. If the key index is greater than the current key index, a FrameKey( ) payload is inserted (424) in the buffer and then the number of bytes inserted into the buffer is returned (426) to the caller by the DRM. The FrameKey( ) payload may include the payload containing the next frame key. If the key index is not lower than the current key index, then the DRM returns (426) the number of bytes inserted in the buffer to the caller. Next, the demultiplexer, is ready to extract (428) the AVI chunk. Through this process, DD info awareness occurs before the demultiplexer extracts the video chunk into the buffer for transmission to the decoder.

In various embodiments, bitstream data insertion occurs in the authentication block of the demultiplexer. The digital rights manager in one embodiment first receives the container's encryption data and temporarily stores or caches the information. The cached encryption data contains the information for the next video chunk. From this information, the digital rights manager can determine the proper bitstream payload to insert, if any. To reduce memory copies, the digital rights manager inserts the bitstream payload before extracting the chunk from the container.

Based on the cached encryption data chunk, the digital rights manager can detect frame key changes. If the frame key index has not changed since the last cached encryption data, no key material is sent. In one embodiment, the encryption data is always transported if there is cached encryption data in the digital rights manager. On the first payload, there will be a synchronization payload to allow the decrypt block to synchronize the wrap sequence. The frame information payloads in one embodiment follow the synchronization payload. It should be appreciated that not all payloads are required to appear in each decrypt block. Furthermore, the processes similar to those described above with reference to FIG. 8 can also be used with respect to other container formats including but not limited to MKV container files.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed is:

1. A playback device for playing back encrypted video, the playback device comprising:
   a set of one or more processors; and
   a non-volatile storage containing a playback application for causing the set of one or more processors to perform the steps of:
      receiving a container file with video data at a parser;
      extracting portions of the container file using the parser, wherein the container file comprises:
         video data with a plurality of partially encrypted frames, wherein each partially encrypted frame contains encrypted portions and unencrypted portions of data; and a set of cryptographic information describing the encrypted portion of each partially encrypted frame, where cryptographic information for a partially encrypted frame comprises:
    cryptographic material for the encrypted portion of the partially encrypted frame, and
    a block reference that identifies the encrypted portion of the partially encrypted frame,
providing each partially encrypted frame, the cryptographic material for each partially encrypted frame, and the block reference for each partially encrypted frame from the parser to a video decoder;
identifying the encrypted portion of each partially encrypted frame using the block reference for each partially encrypted frame;
deciphering a frame key for each partially encrypted frame using the cryptographic material for each partially encrypted frame to produce a frame key for each partially encrypted frame;
decrypting the encrypted portion of each partially encrypted frame based upon the frame key for each partially encrypted frame using the video decoder; and
decoding each decrypted frame for rendering on a display device using the video decoder.

2. The playback device of claim 1, wherein each partially encrypted frame is provided by the parser to a video decoder over an unsecured channel.

3. The playback device of claim 1, wherein each block reference comprises offset and length information.

4. The playback device of claim 1, wherein the playback application is further for causing the set of processors to communicate with a digital rights management component to decipher a frame key for each partially encrypted frame from the cryptographic material for each partially encrypted frame.

5. The playback device of claim 1, wherein the frame key is encrypted to restrict playback to a particular user.

6. The playback device of claim 1, wherein the frame key is encrypted to restrict playback to a particular user.

7. The playback device of claim 1, wherein the playback application is further for causing the set of one or more processors to stream the container file.

8. The playback device of claim 1, wherein:
the playback application is further for causing the set of one or more processors to perform the step of providing each partially encrypted frame, the cryptographic material for each partially encrypted frame, and the block reference for each partially encrypted frame from the parser to a video decoder by building a cryptographic payload comprising:
    cryptographic material for a partially encrypted frame, and
    a block reference for the partially encrypted frame.

9. The playback device of claim 8, wherein the cryptographic payload is delimited by an identifier.

10. The playback device of claim 9, wherein the decoder uses the identifier to extract cryptographic material for the partially encrypted frame and the block reference for the partially encrypted frame from the cryptographic payload.

11. The playback device of claim 1, wherein the playback application is further for causing the set of one or more processors to perform the step of inserting the cryptographic payload at the front of each partially encrypted frame of video that is demultiplexed by the parser.

12. The playback device of claim 1, further comprising inserting the cryptographic payload at the front of each partially encrypted frame of video using the parser.

13. The playback device of claim 1, an encrypted portion of a partially encrypted frame comprises a frame header.

14. The playback device of claim 1, wherein an unencrypted portion of a partially encrypted frame comprises a frame header.

15. A method for playing back encrypted video, the method comprising:
receiving a container file with video data at a parser;
extracting portions of the container file using the parser, wherein the container file comprises:
    video data with a plurality of partially encrypted frames, wherein each partially encrypted frame contains encrypted portions and unencrypted portions of data; and
    a set of cryptographic information describing the encrypted portion of each partially encrypted frame, where cryptographic information for a partially encrypted frame comprises:
        cryptographic material for the encrypted portion of the partially encrypted frame, and
        a block reference that identifies the encrypted portion of the partially encrypted frame,
providing each partially encrypted frame, the cryptographic material for each partially encrypted frame, and the block reference for each partially encrypted frame from the parser to a video decoder;
identifying the encrypted portion of each partially encrypted frame using the block reference for each partially encrypted frame;
deciphering a frame key for each partially encrypted frame using the cryptographic material for each partially encrypted frame to produce a frame key for each partially encrypted frame;
decrypting the encrypted portion of each partially encrypted frame based upon the frame key for each partially encrypted frame using the video decoder; and
decoding each decrypted frame for rendering on a display device using the video decoder.

16. The method of claim 15, wherein each partially encrypted frame is provided by the parser to a video decoder over an unsecured channel.

17. The method of claim 15, wherein each block reference comprises offset and length information.

18. The method of claim 15 further comprising communicating with a digital rights management component to decipher a frame key for each partially encrypted frame from the cryptographic material for each partially encrypted frame.

19. The method of claim 15, wherein the frame key is encrypted to restrict playback to a particular user.

20. The method of claim 15, wherein the frame key is encrypted to restrict playback to a particular user.

21. The method of claim 15, wherein providing each partially encrypted frame, the cryptographic material for each partially encrypted frame, and the block reference for each partially encrypted frame from the parser to a video decoder further comprises building a cryptographic payload comprising:
    cryptographic material for a partially encrypted frame, and
    a block reference for the partially encrypted frame.

22. The method of claim 21, wherein the cryptographic payload is delimited by an identifier.

23. The method of claim 22, further comprising extracting cryptographic material for the partially encrypted frame and the block reference for the partially encrypted frame from the cryptographic payload based upon the identifier using the video decoder.

24. The method of claim 15, wherein an encrypted portion of a partially encrypted frame comprises a frame header.

25. The method of claim 15, wherein an unencrypted portion of a partially encrypted frame comprises a frame header.

* * * * *